United States Patent
Omori et al.

(10) Patent No.: US 9,762,570 B2
(45) Date of Patent: Sep. 12, 2017

(54) INFORMATION PROCESSING SYSTEM, INFORMATION PROCESSING METHOD AND COMPUTER READABLE RECORDING MEDIUM STORED A PROGRAM

(71) Applicant: FUJITSU LIMITED, Kawasaki-shi, Kanagawa (JP)

(72) Inventors: Makoto Omori, Kawasaki (JP); Shinichiro Nishizawa, Kawasaki (JP); Yasushi Toriwaki, Yokohama (JP); Takashi Yoshino, Saitama (JP); Hisashi Sugawara, Yokohama (JP); Masaki Nagao, Yokohama (JP); Kosuke Tao, Kawasaki (JP); Keiko Ishii, Fuchu (JP); Tsuyoshi Taneishi, Shizuoka (JP); Kenichi Yamashita, Yokohama (JP); Mitsuhiro Sato, Kawasaki (JP); Atsushi Wataki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/640,614

(22) Filed: Mar. 6, 2015

(65) Prior Publication Data
US 2015/0180861 A1     Jun. 25, 2015

Related U.S. Application Data

(63) Continuation of application No. PCT/JP2012/072720, filed on Sep. 6, 2012.

(51) Int. Cl.
*H04L 29/06*     (2006.01)
*H04L 9/32*     (2006.01)

(52) U.S. Cl.
CPC ............... *H04L 63/0823* (2013.01)

(58) Field of Classification Search
CPC ... G06F 21/31; G06F 21/33; H04L 2463/121; H04L 63/0807; H04L 63/0823;
(Continued)

(56) References Cited

U.S. PATENT DOCUMENTS

| 7,275,155 | B1 * | 9/2007 | Aull | .......................... H04L 9/00 |
| | | | | 713/157 |
| 2005/0138361 | A1 * | 6/2005 | Saarepera | ............. H04L 9/3263 |
| | | | | 713/156 |

(Continued)

FOREIGN PATENT DOCUMENTS

| JP | 2003-288441 | 10/2003 |
| JP | 2003-308443 | 10/2003 |

(Continued)

OTHER PUBLICATIONS

International Search Report mailed Dec. 11, 2012 for correspond International Patent Application No. PCT/JP2012/072720.

*Primary Examiner* — Gary Gracia
(74) *Attorney, Agent, or Firm* — Staas & Halsey LLP

(57) ABSTRACT

Information processing system includes a first certification device which executes a first temporary certification, creates a first temporary certificate, transmits it to an external device, carries out a first formal certification and creates the first formal certificate, a second certification device which executes a second temporary certification based on the first temporary certification, creates a second temporary certificate, transmits it to the external device, carries out a second formal certification and creates the second formal certificate, and a processing device which verifies a validity of the first formal certificate corresponding to the first temporary certificate and a validity of the second formal certificate corresponding to the second temporary certificate from the user, in response to a information processing request from the (Continued)

user and determines to execute the information processing corresponding to the information processing request based on the verification result.

19 Claims, 25 Drawing Sheets

(58) Field of Classification Search
CPC . H04L 63/061; H04L 63/123; H04L 65/1006; H04L 9/3247; H04L 9/3268; H04L 9/32; H04L 9/3265; H04L 63/10; H04L 67/04
USPC .............................................. 726/7; 713/156
See application file for complete search history.

(56) References Cited

U.S. PATENT DOCUMENTS

| | | | | |
|---|---|---|---|---|
| 2006/0059333 A1* | 3/2006 | Gentry | ................. | H04L 9/3236 713/156 |
| 2006/0080440 A1 | 4/2006 | Vasandani et al. | | |
| 2006/0294378 A1* | 12/2006 | Lumsden | ................ | G06Q 20/02 713/171 |
| 2007/0245152 A1* | 10/2007 | Pizano | ................ | H04L 63/0861 713/186 |
| 2008/0022104 A1* | 1/2008 | Deishi | ................ | H04L 63/0823 713/175 |
| 2009/0070540 A1* | 3/2009 | Dewa | ................... | H04H 60/73 711/163 |
| 2009/0327696 A1* | 12/2009 | Hatlelid | .............. | H04L 63/0823 713/151 |
| 2010/0153713 A1* | 6/2010 | Klein | ................... | H04L 9/3268 713/158 |
| 2010/0205429 A1* | 8/2010 | Alrabady | ............ | H04L 63/0823 713/156 |
| 2010/0299520 A1* | 11/2010 | Murakawa | .......... | H04L 63/0442 713/156 |
| 2010/0306839 A1* | 12/2010 | Tie | ........................ | H04L 9/3213 726/9 |
| 2011/0016328 A1* | 1/2011 | Qu | ...................... | G06F 21/6254 713/189 |
| 2011/0060908 A1* | 3/2011 | Pizano | ................ | H04L 63/0861 713/168 |
| 2011/0154027 A1* | 6/2011 | Liu | ...................... | H04L 63/0823 713/158 |
| 2012/0075311 A1* | 3/2012 | Tomita | ............... | H04N 1/00408 345/473 |
| 2012/0087493 A1* | 4/2012 | Chidambaram | ...... | H04L 9/0841 380/44 |
| 2012/0204250 A1* | 8/2012 | Anderson | ............ | G06Q 10/107 726/9 |
| 2012/0210415 A1* | 8/2012 | Somani | ............... | H04L 63/0884 726/9 |
| 2012/0215700 A1* | 8/2012 | Falk | ................... | G06Q 20/3276 705/67 |
| 2012/0259782 A1* | 10/2012 | Hammad | ............... | G06Q 20/12 705/44 |
| 2012/0304273 A1* | 11/2012 | Bailey | ................... | H04L 9/0891 726/9 |
| 2012/0311686 A1* | 12/2012 | Medina | ............... | H04L 63/0807 726/7 |
| 2013/0166907 A1* | 6/2013 | Brown | ................. | H04L 9/3265 713/156 |
| 2013/0219468 A1* | 8/2013 | Bell | ........................ | H04L 63/10 726/4 |
| 2013/0244614 A1* | 9/2013 | Santamaria | ............. | H04L 51/04 455/411 |
| 2013/0276058 A1* | 10/2013 | Buldas | .................... | G06F 21/64 726/2 |
| 2014/0010210 A1* | 1/2014 | Rhodes | .................... | G08G 9/00 370/336 |
| 2015/0236860 A1* | 8/2015 | Brown | .................. | H04L 9/3268 713/156 |

FOREIGN PATENT DOCUMENTS

| | | |
|---|---|---|
| JP | 2005-78428 | 3/2005 |
| JP | 2005-301424 | 10/2005 |

\* cited by examiner

INFORMATION PROCESSING SYSTEM, INFORMATION PROCESSING METHOD AND COMPUTER READABLE RECORDING MEDIUM STORED A PROGRAM

CROSS-REFERENCE TO RELATED APPLICATION

This application is a continuation application of International Application Number PCT/JP2012/072720 filed on Sep. 6, 2012 and designated the U.S., the entire contents of which are incorporated herein by reference.

FIELD

The embodiments discussed herein are related to information processing system, information processing method and a computer readable recording medium stored program.

BACKGROUND

In a system which provides secure information processing service to a user, a plurality of certification processing (described as certification appropriately as follows) are performed sequentially. And when all certification succeeds, the information processing service is provided to a user. Such a system carries out a first certification, and carries out a second certification when the first certification succeeds and executes information processing service when the second certification succeeds, for example. On the other hand, there is an electronic approval system which carries out a workflow that transmits a document for the circulation to a person targeted for circulation sequentially. In this system, this workflow is completed when the approval results of all people of object are acquired by the processing.

CITATION LIST

Patent Document

[patent document 1] Japanese Laid-open Patent publication No. 2005-78428
[patent document 2] Japanese Laid-Open Patent publication No. 2003-308443

In the certification that the above system carries out, when a certification result wait state occurs in a certain certification processing, the system may need much time before carrying out the information processing service. The certification result wait state becomes easy to occur, when the load of a server carrying out the certification is a heavy, when quantity of data communication is large, or when human operation intervenes in a processing process. In addition, when a large number of certification requests arrive at the system at the same time, thereby the access for a server carrying out the certification concentrates, the certification result wait state occurs because it is difficult that the server processes all certification requests.

For example, in the system which carries out the second certification when first certification succeeds, when the certification result wait state occurs in the first certification, it is difficult to perform the second certification during this certification result wait state. And the second certification processing is started after the first certification that the certification result wait state produced succeeded. Though the first certification is carried out fairly and succeeded, the second certification processing becomes late because of the certification result wait state that occurred by the first certification.

As described above, because the certification result wait state occurs, the system may need much time before carrying out the information processing service. Specially, when carrying out the complicated certification to enhance security, the certification result wait state becomes easy to occur, because the certification time becomes long.

SUMMARY

A first aspect of the information processing system includes a first certification device which carries out a first temporary certification in response to a request from a user, creates a first temporary certificate, transmits the first temporary certificate to an external device which transmits the request from the user, carries out a first formal certification and creates a first formal certificate; a second certification device which carries out a second certification based on the first temporary certificate in response to a request from the user, creates a second temporary certificate, transmits the second temporary certificate to the external device, carries out a second formal certification and creates a second formal certificate; and a processing device which verifies a validity of the first formal certificate corresponding to the first temporary certificate and a validity of the second formal certificate corresponding to the second temporary certificate in response to information processing request including the first temporary certificate and the second temporary certificate from the user, and determines whether an information processing corresponding to the information processing request is executed based on a verification result.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First Embodiment (System)

Figure 1:
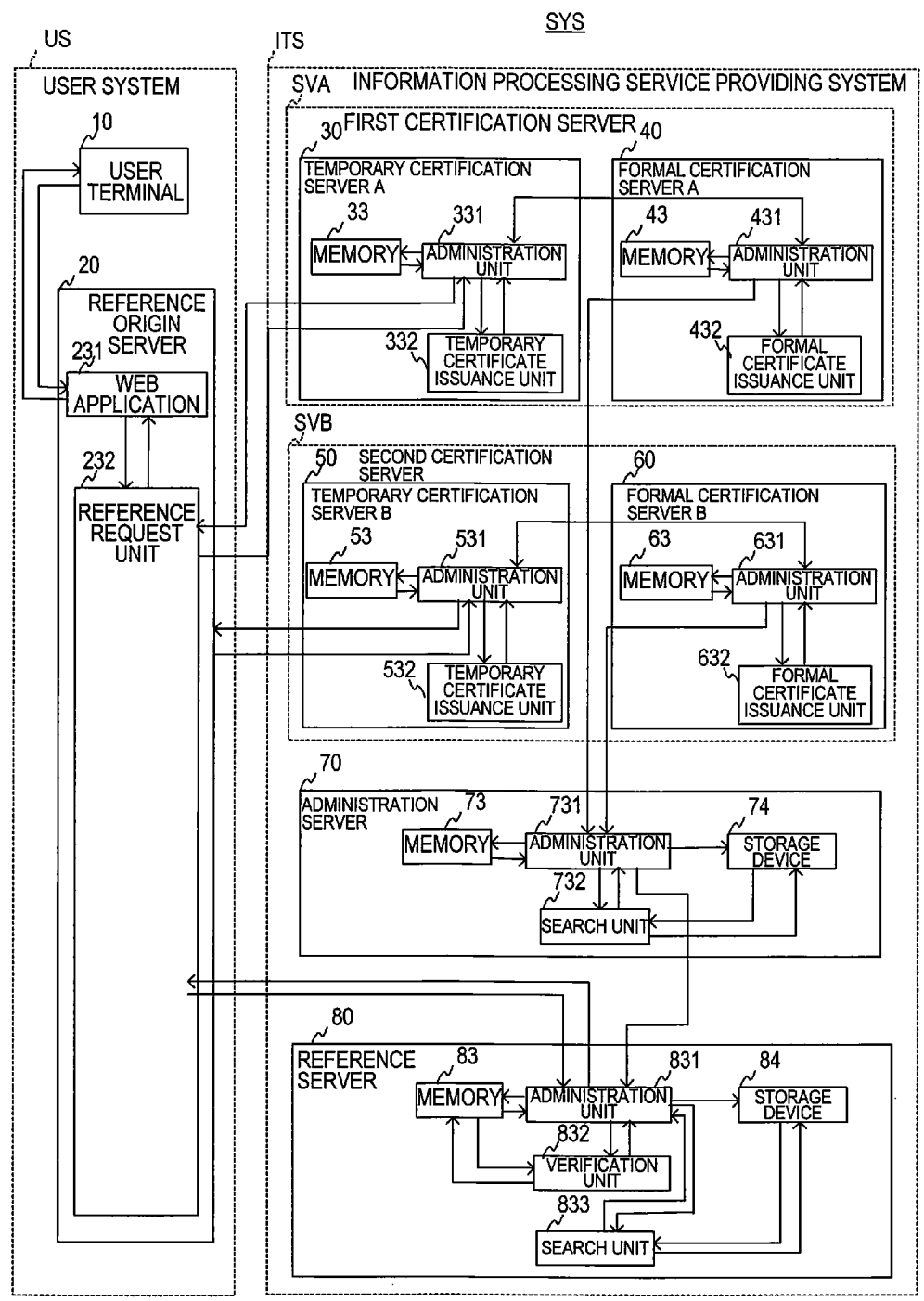
FIG. 1 is a hardware block diagram explaining an information processing system SYS according to an embodiment.

FIG. 1 is a hardware block diagram explaining an information processing system SYS according to an embodiment. In the explanation of the following diagrams, same constitution and same processing are marked by same references, and the explanations of the repetition are omitted appropriately. The information processing system SYS includes a user system US and an information processing service providing system ITS. The user system US is a system for users which use the information processing service providing system ITS. A user terminal 10 in the user system US is, for example, a personal computer and carries out an application such as a browser. The user terminal 10 is one case of the external device of the user.

A reference origin server 20 in the user system US is a Web server which provides an interface between the user terminal 10 and the information processing service providing system ITS. The reference origin server 20 includes a Web application 231 and a reference request unit 232. The web application 231 is application to carry out data transmission and reception with the user terminal 10 and to provide a Web server function. The reference request unit 232 executes various requests to the information processing service providing system ITS in response to a request from the user terminal 10 and receives the data of which the information processing service providing system ITS transmitted in response to the various requests.

The information processing service providing system ITS carries out the plurality of certifications in response to the execution request of the information processing service from the user sequentially. And the information processing service providing system ITS provide secure information processing service to the user by carrying out required information processing service when all certification succeeds. In addition, the information processing service providing system ITS may accept the execution request of large number of information processing services.

For example, the information processing service providing system ITS carries out the first certification in response to the execution request, then performs the second certification when the first certification succeeds, and carries out required information processing service when the second certification succeeds. An example of the information processing service includes acquisition process of tax payment recorded data and acquisition process of resident's card data.

The reason why the certification is divided into the first certification and the second certification in this way is to realize distribution of the load in the certification. Besides, this is because a certification organization having authority to carry out each certification is different because objects to prove in each certification are different.

Here, the first certification is confirmation processing whether a user who requests the execution of the information processing service is a fair user or not. In other words, the first certification is for proving (called as the person proof or the person certification) that a user requesting the execution is a person himself and for avoiding so-called "spoofing attack".

Next, the second certification is proving processing (called as the authority proof, or the authority certification) whether a user who requests the execution of the information processing service has authority to require the execution of the information processing service and authority to acquire the execution result of the information processing service more. In other words, the second certification includes the authorization for a certain processing. For example, in the case that the execution request of the information processing service by the user is a request (called as the transmission request) to acquire a certain data, the second certification proves whether or not acquisition of the data is possible by the user and avoids so-called "unauthorized access".

As described above, the information processing service providing system ITS, when providing the information processing service required by a user, divides the certification into the first certification to prove the person himself for evading "spoofing attack" and the second certification proving authority to evade "injustice access" and performs each certification with a cooperation. The reason why each certification is divided in this way is for distribute the certification processing and that a proof object (person proof) of the first certification and a proof object (authority proof) of the second certification are different, as described above.

As illustrated in FIG. 1, the information processing service providing system ITS includes a first certification server SVA and a second certification server SVB and an administration server 70 and a reference server 80. The first certification server SVA is a server carrying out the first certification. The first certification server SVA carries out the first temporary certification and the first formal certification when carrying out the first certification for avoiding so-called "spoofing attack".

The second certification server SVB is a server carrying out the second certification avoiding so-called "unauthorized access". The second certification server SVB carries out the second temporary certification and the second formal certification when carrying out the second certification.

The temporary certification means the simple certification (called as the basic certification) based on a user identifier (as described an identifier with ID appropriately as follows) and a password, for example. The formal certification is the certification using the certification agreement that is high in certification strength such as the PKI (Public Key Infrastructure) certification, for example. If the certification strength is high, it means that the security is high.

The formal certification has the certification strength that is higher than certification strength of the temporary certification and many processes of the certification processing. In other words, the formal certification is the certification that is more complicated than the temporary certification, and a time from a start of the formal certification to an end of the formal certification (also call as the processing time) is longer than a time from the start of the temporary certification to the end of the temporary certification. In the following explanation, the temporary certificate is the certificate indicating the execution result of the temporary certification and means a certificate proving that was certified by the temporary certification. The formal certificate is the certificate indicating the execution result of the formal certification and means a certificate proving that was certified by the formal certification.

In addition, in the run time of the formal certification, data structure of the formal certification execution is defined based on a standard agreement (also called as the standard, or the specification). For example, for these data, it is the formal certificate. This agreement, when the certification does not include the authorization, is, for example, SAML (Security Assertion Markup Language) and, when the certification includes the authorization for the processing with the certification, is, for example, XACML (eXtensible Access Control Markup Language). The authorization will be described later.

The first certification server SVA carries out the first temporary certification in response to the request from the user, creates the first temporary certificate, transmits it to the user terminal 10 which transmitted the request from the user, carries out the first formal certification and creates the first formal certificate.

The first certification server SVA has a temporary certification server A30 and a formal certification server A40. The temporary certification server A30 carries out the first temporary certification (described as temporary certification A appropriately as follows) in the first certification. The first certification server SVA is a server of which a certification organization (called as the Certificate Authority) having authority to carry out the first certification installed.

The temporary certification server A30 includes a memory 33 and an administration unit 331 and a temporary certificate issuance unit 332. The administration unit 331 controls various processing that the temporary certification server A30 carries out and manages the processing contents. The administration unit 331 receives the first certification information which is transmitted as a request from a user from the user terminal 10. In addition, the first certification information will be explained by FIG. 3.

The temporary certificate issuance unit 332 carries out a temporary certification A based on the temporary certification information of the first certification information which is received, and issues (also called as creates) the first temporary certificate (also described as the temporary certificate A appropriately as follows) indicating the execution result of the temporary certification A. Furthermore, the temporary certificate issuance unit 332 transmits the temporary certificate A to the user terminal 10. And the temporary certificate issuance unit 332 requests an execution of the first formal certification in the first certification to the formal certification server A40.

The formal certification server A40 carries out the first formal certification (described as the formal certification A appropriately as follows). The formal certification server A40 includes a memory 43 and an administration unit 431 and a formal certificate issuance unit 432. The administration unit 431 controls various processing that the formal certification server A40 carries out and manages the processing contents. The administration unit 431 receives the formal certification information of the first certification information with an execution request of the formal certification A.

The formal certificate issuance unit 432 carries out the formal certification A including the certification strength that is higher than the certification strength of the temporary certification A, based on the formal certification information of the first certification information which is received, in response to the execution request of the formal certification A, and issues (also called as creates) the first formal certificate (described as the formal certificate A appropriately as follows) indicating the execution result of the formal certification A. Furthermore, the formal certificate issuance unit 432 stores the formal certificate A to the storage device 74 in the administration server 70.

The second certification server SVB carries out the second temporary certification based on the temporary certificate A in response to the request from the user, creates the second temporary certificate, transmits it to the user terminal 10 and carries out the second formal certification and creates the second formal certificate.

The second certification server SVB has a temporary certification server B50 and a formal certification server B60. The temporary certification server B50 carries out the second temporary certification (described as temporary certification B appropriately as follows) in the second certification. The second certification server SVB is a server of which a certification organization having authority to carry out the second certification installed.

The temporary certification server B50 includes a memory 53 and an administration unit 531 and a temporary certificate issuance unit 532. The administration unit 531 controls various processing that the temporary certification server B50 carries out and manages the processing contents. The administration unit 531 receives the temporary certificate A and the second certification information transmitted as a request from a user from the user terminal 10. In addition, the second certification information will be explained by FIG. 3.

The temporary certificate issuance unit 532 carries out the temporary certification B based on the temporary certificate A which is received, and issues (called as creates) the second temporary certificate (described as temporary certificate B appropriately as follows) indicating the execution result of the temporary certification B. Furthermore, the temporary certificate issuance unit 532 transmits the temporary certificate B to the user terminal 10. And the temporary certificate issuance unit 532 requests an execution of the second formal certification in the second certification to the formal certification server B60.

The formal certification server B60 carries out the second formal certification (described as formal certification B appropriately as follows). The formal certification server B60 includes a memory 63 and an administration unit 631 and a formal certificate issuance unit 632. The administration unit 631 controls various processing that the formal certification server B60 carries out and manages the processing contents. The administration unit 631 receives the formal certification information of the second certification information with an execution request of the formal certification B.

The formal certificate issuance unit 632 carries out the formal certification B including the certification strength that is higher than the certification strength of the temporary certification B, based on the formal certification information of the second certification information which is received, in response to the execution request of the formal certification B, and issues (also called as creates) the second formal certificate (described as formal certificate B appropriately as follows) indicating the result of the formal certification B. Furthermore, the formal certificate issuance unit 632 stores the formal certificate B to the storage device 74 in the administration server 70.

In addition, the first certification server SVA and the second certification server SVB are also called as a first certification device and a second certification device each. In addition, the temporary certification server A30 and the formal certification server B40 are also called as a first temporary certification device and a first formal certification device each. Further, the temporary certification server B50 and the formal certification server B60 are also called as a second temporary certification device and a second formal certification device each.

The administration server 70 stores (also called as memorizes) the formal certificate A and the formal certificate B and transmits the formal certificate A and the formal certificate B to the reference server 80 in response to a request from the reference server 80. The administration server 70 is one example of a storage device storing the formal certificate A and the formal certificate B. The administration server 70 is the server of which an organization carrying out the information processing service installed. The administration server 70 is also called as a certification and authorization result database.

The administration server 70 includes a memory 73 and a storage device 74 and an administration unit 731 and a search unit 732. The administration unit 731 controls various processing that the administration server 70 carries out and manages the processing contents. The search unit 732 carries out search process of the formal certificate A and the formal certificate B. The storage device 74 stores the formal certificate A and the formal certificate B.

The reference server 80 is a server executing the information processing request required by the user, and is called as a processing device. For example, the information processing request is the reference request of the tax payment record of the user. In the following description, as the information processing request, the reference request of the tax payment record of the user is exemplified. The reference server 80 is the server of which an organization carrying out information processing service installed.

The reference server 80 includes a memory 83 and a storage device 84, an administration unit 831, a verification unit 832 and a search unit 833. The administration unit 831 controls various processing that the reference server 80 carries out and manages the processing contents. The administration unit 831 receives an information processing request including the temporary certificate A and the temporary certificate B from the user. The verification unit 832 verifies a validity of the formal certificate A corresponding to the temporary certificate A and a validity of the formal certificate B corresponding to the temporary certificate B of which the administration unit 831 received, in response to the above information processing request. The verification unit 832 determines whether or not the information processing corresponding to the information processing request is executed based on the verification result. When the verification succeeds, the verification unit 832 determines that the execution of the information processing corresponding to the information processing request is possible. When the verification unit 832 determines that the execution of the above information processing is possible, the search unit 833 carries out the information processing corresponding to the information processing request. And the search unit 833 transmits the execution result to the user terminal 10. In the above example, the information processing request is the reference request of the tax payment record of the user. Therefore, the search unit 833, in response to the reference request of the user, searches the tax payment recorded data of the user from the storage device 84, and transmits the tax payment recorded data of the user which is searched to the user terminal 10.

The storage device 84 stores various duties data. Business data is, for example, tax payment recorded data and resident's card data.

(Flow of the Processing in the Information Processing System)

Figure 2:
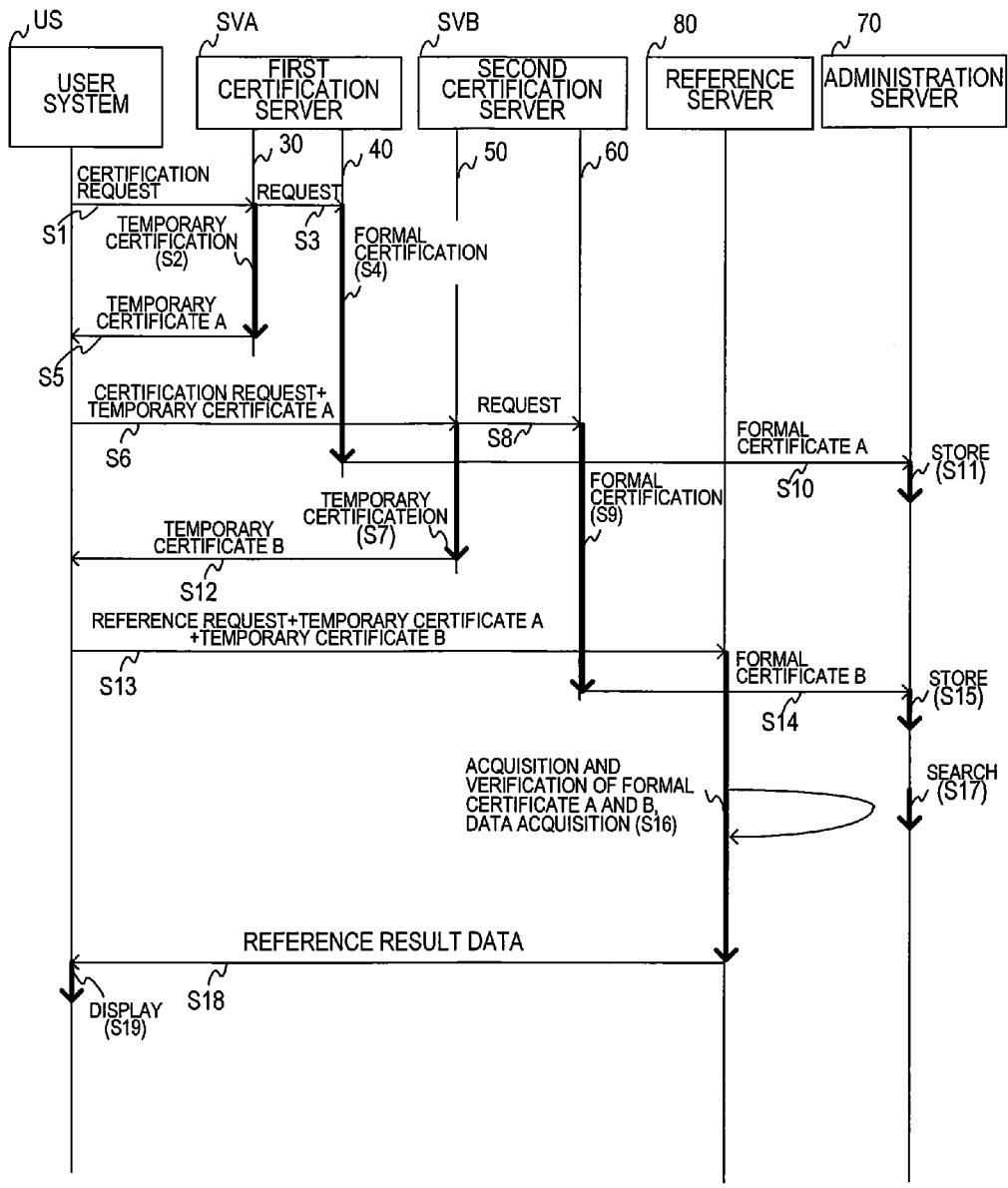
FIG. 2 is a diagram explaining a flow of the process in the information processing system SYS in FIG. 1.

FIG. 2 is a diagram explaining a flow of the process in the information processing system SYS in FIG. 1. In addition, in FIG. 2, a mark 30, a mark 40, a mark 50 and a mark 60 indicate flows of the process of the temporary certification server A, the formal certification server A, the temporary certification server B, and the formal certification server B each. In addition, the length of the bold line arrows such as a mark S2 and a mark S4 schematically indicate time length for processing corresponding to this arrow. Here, the time length of the process of the temporary certification A indicated by a bold line arrow of mark S2 and the time length of the processing of the temporary certification B indicated by an arrow of mark S7 are illustrated with exaggeration. In other words, the time length of the process in the temporary certification A is short enough in comparison with the time length of the processing of the formal certification A and the time length of the process of the temporary certification B is short enough in comparison with the time length of the processing of the formal certification B.

Step S1: The administration unit 151 in the user terminal 10 of the user system US requests a certification through the reference origin server 20 to the temporary certification server A30 in the first certification server SVA. In addition, more information about the step S1 will be explained in steps S101 and S102 in FIG. 11 and step S201 in FIG. 12.

Step S2: The temporary certificate issuance unit 332 in the temporary certification server A30 carries out the temporary certification A in response to the certification request. The temporary certification A is a simple certification by the user ID and the password. The temporary certificate issuance unit 332 in the temporary certification server A30 issues the temporary certificate A of the temporary certification A after the execution of the temporary certification A. By issuing this temporary certificate A, it is assumed that the first certification succeeds, and the second certification will be carried out afterward. In addition, more information about step S2 will be explained in step S301-S306 of FIG. 13.

Step S3: The administration unit 331 in the temporary certification server A30 requests the formal certification to the formal certification server A40 in response to a certification request. In addition, more information about the step S3 will be later explained in step S307 of FIG. 13.

Step S4: The formal certificate issuance unit 432 in the formal certification server A40 carries out the formal certification A in response to a formal certification request. The formal certification A is the certification that is high in certification strength using the PKI certification. The formal certificate issuance unit 432 issues the certificate A of the formal certification A after execution of the formal certification A. In addition, more information about the step S4 will be later explained in step S401-step S406 of FIG. 14.

Step S5: The administration unit 331 in the temporary certification server A30 transmits the temporary certificate A of which the temporary certificate issuance unit 332 issued to the reference origin server 20. In addition, more information about the step S5 will be later explained in step S308 of FIG. 13.

Step S6: The reference request unit 232 in the reference origin server 20 receives the temporary certificate A and transmits the temporary certificate A, which is received, with the certification request, to the temporary certification server B50 in the second certification server SVB. In addition more information about the step S6 will be later explained in step S202, S203 of FIG. 12.

Step S7: The temporary certificate issuance unit 532 in the temporary certification server B50 carries out the temporary certification B in response to a certification request. The temporary certification B is the simple certification to verify the period of validity of the temporary certificate A. The temporary certificate issuance unit 532 in the temporary certification server B50 issues the temporary certificate B of the temporary certification B after execution of the temporary certification B. In addition more information about the step S7 will be later explained in step S501-S506 of FIG. 15.

Step S8: The administration unit 531 in the temporary certification server B50 requests the formal certification to the formal certification server B60 in response to a certification request. In addition, more information about the step S8 will be later explained in step S507 of FIG. 15.

Step S9: The formal certificate issuance unit 632 in the formal certification server B60 carries out the formal certification B in response to the formal certification request. The formal certification B is the certification that is high in certification strength using the PKI certification. The formal certificate issuance unit 632 issues the formal certificate B of the formal certification B after the execution of the formal certification B. In other words, the formal certification server B60 in the second certification server SVB carries out the formal certification B in response to the formal certification request from the temporary certification server B50 which received the temporary certificate A. As explained in the step S2, this is because that it is supposed that the first certification succeeded by issuing the temporary certificate A. In addition, more information about the step S9 will be later explained in step S601-step S606 of FIG. 16.

By the way, the formal certification A (referring to the step S4), of which the formal certificate issuance unit 432 in the formal certification server A40 is carrying out, is finished during the execution of the temporary certification B in the step S7 and the formal certification B in the step S9. In other words, the formal certificate issuance unit 432 issues the formal certificate A by the end of the formal certification A.

Step S10: The administration unit 431 in the formal certification server A40 transmits the formal certificate A, of which the formal certificate issuance unit 432 issued, to the administration server 70. In addition, more information about the step S10 will be later explained in step S407 of FIG. 14.

Step S11: The administration unit 731 in the administration server 70 receives the formal certificate A and stores the formal certificate A which is received to the storage device 74. In addition, more information about the step S11 will be later explained in step S701, step S702 of FIG. 17.

By the way, in the step S7, the process moves to step S12 when the temporary certificate issuance unit 532 in the temporary certification server B50 finishes the temporary certification B and issues the temporary certificate B.

Step S12: The administration unit 531 in the temporary certification server B50 transmits the temporary certificate B of which the temporary certificate issuance unit 532 issued to the reference origin server 20. In addition, more information about the step S12 will be later explained in step S508 of FIG. 15.

Step S13: The reference request unit 232 in the reference origin server 20 receives the temporary certificate B and transmits the temporary certificate A (referring to the step S5) and the temporary certificate B to the reference server 80, with the reference request. This reference request is, for example, a reference request of the tax payment record. In addition, more information about the step S13 will be later explained in step S204, S205 of FIG. 12.

By the way, the process of the formal certification B, of which the formal certificate issuance unit 632 in the formal certification server B60 carries out (referring to the step S9), is finished. In other words, the formal certificate issuance unit 632 issues the formal certificate B by the end of the formal certification B.

Step S14: The administration unit 631 in the formal certification server B60 transmits the formal certificate B, of which the formal certificate issuance unit 632 issued, to the administration server 70. In addition, more information about the step S14 will be later explained in step S607 of FIG. 16.

Step S15: The administration unit 731 in the administration server 70 receives the formal certificate B and stores the formal certificate B which is received to the storage device 74. In addition, more information about the step S15 will be later explained in step S703, step S704 of FIG. 17. At the stage when the formal certificate A and the formal certificate B are assembled, the first certification and the second certification are finished. When the second certification succeeds and the verifications of the formal certificate A and the formal certificate B succeeds as explained later in step S16, the success of the first certification, which is supposed to, is regarded as a certain.

Step S16: The administration unit 831 in the reference server 80 requests a transmission of the formal certificate A and the formal certificate B to the administration server 70 in response to the reference request which is explained in the step S13 and acquires the formal certificate A and the formal certificate B from the administration server 70. The verification unit 832 carries out the verification of the formal certificate A and the formal certificate B which are acquired. When the verification succeeds, the search unit 833 in the reference server 80 searches the reference result data corresponding to the reference request from the storage device 84. More information on the step S16 will be later explained in step S801-step S806 of FIG. 19.

Step S17: The administration server 70 searches the formal certificate A and the formal certificate B, in response to a transmission request of the formal certificate A and the formal certificate B from the reference server 80, and transmits it to the reference server 80. In addition, more information about the step S17 will be explained later in step S711-step S714 of FIG. 18.

Step S18: The administration unit 831 in the reference server 80 transmits the reference result data, of which the search unit 833 searched, to the user terminal 10 through the reference origin server 20. In addition, more information about the step S18 will be explained later in step S807 of FIG. 19.

Step S19: The user terminal 10 receives the reference result data transmitted from the reference server 80 and displays it. In addition, more information about step the S19 will be explained later in step S103, S104 in FIG. 11 and step 206, S207 in FIG. 12.

(User Terminal)

Figure 3:
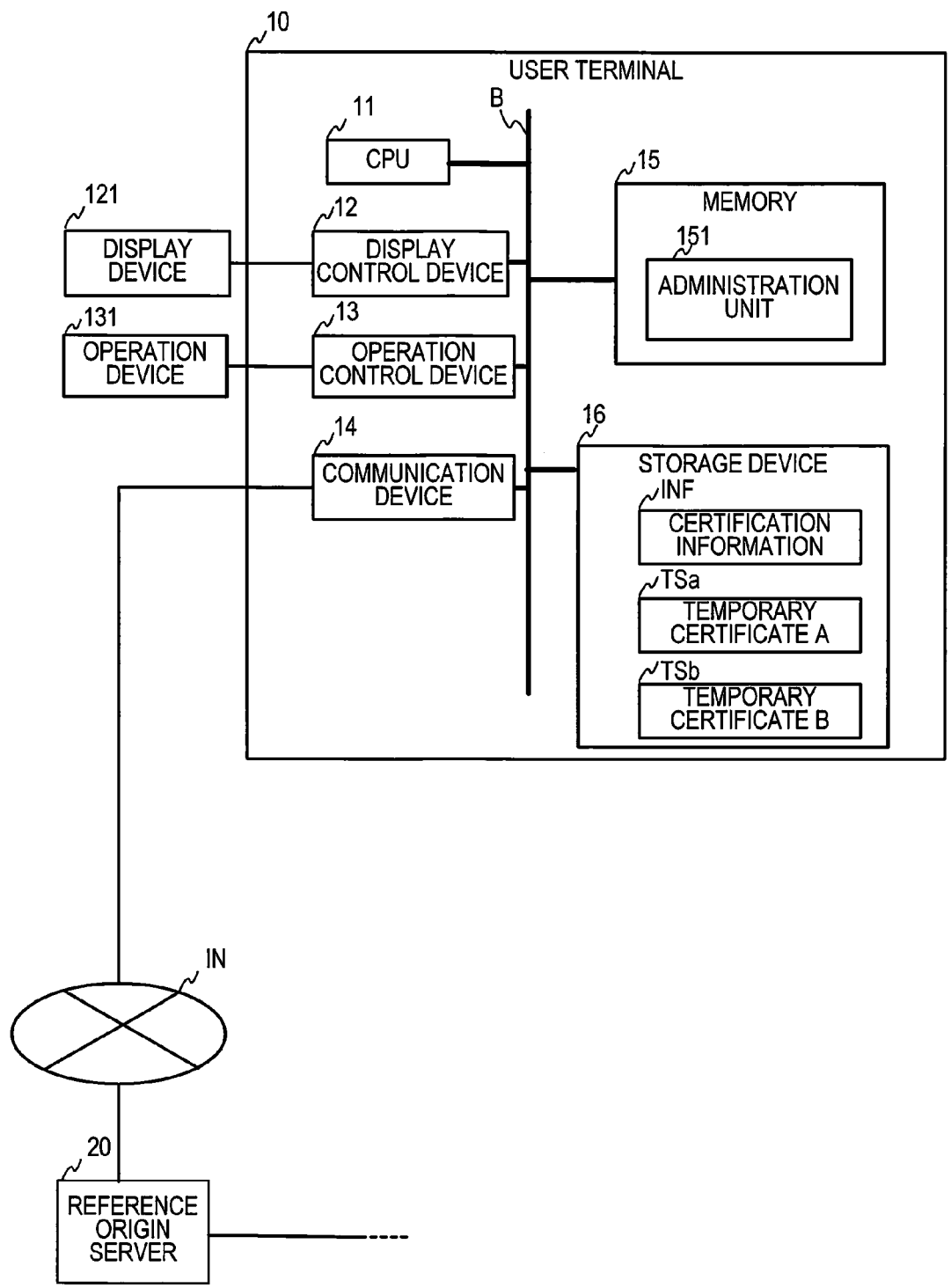
FIG. 3 is a diagram illustrating an example of the hardware block of user terminal 10 in FIG. 1.

FIG. 3 is a diagram illustrating an example of the hardware block of user terminal 10 in FIG. 1. As illustrated in FIG. 3, a display device 121 such as a liquid crystal display and an operation device 131 such as a keyboard or a mouse are connected to the user terminal 10.

The user terminal 10 includes a CPU (Central Processing Unit) 11, a display control device 12, an operation control device 13, a communication device 14, a memory 15 and a storage device 16, which are mutually connected through a bus B, for example.

The CPU 11 is a computer (control unit) which controls the whole of the user terminal 10. The display control device 12 carries out processing to display various images to the display device 121. Here, various images are the reference request screens, for example. The operation control device 13 carries out various processing in response to operation instructions for operation instructions input from the operation device 131.

The communication device 14 is a device communicating with the reference origin server 20 through Internet IN. The communication device 14 is a so-called network interface card (NIC: Network Interface Card).

The memory 15 stores data, which is processed in various information processing, and various programs that the CPU 11 carries out temporarily. The administration unit 151 which illustrated by FIG. 1 is so-called program, and, for example, this program is stored in the storage device 16. The CPU 11 retrieves these programs from the storage device 16 at the time of start, and develops it in the memory 15 to functionalize these programs as a software module.

The storage device 16, for example, is a magnetic storage device such as a hard disk drive (HDD) and a nonvolatile memory and stores the above program and various data. As these various data, there is certification information indicated by a mark INF, the temporary certificate A indicated by a mark TSa and the temporary certificate B indicated by a mark TSb. The certification information INF has the first certification information corresponding to a user ID which is described later and the second certification information. The first certification information is information necessary for the certification server A40 in the first certification server SVA to carry out the formal certification A. In addition, the first information includes necessary information that the temporary certification server A30 in the first certification server SVA carries out the temporary certification A, as explained in step S102 of FIG. 11. The above necessary information is input user ID and password as explained in step S102 of FIG. 11. The second certification information is information necessary for the formal certification server B60 in the second certification server SVB to carry out the formal certification B.

When this above certification is the PKI certification, the certification information INF has an electronic certificate for the formal certification A as a part of the first certification information and an electronic certificate for the formal certification B as a part of the second certification information. The electronic certificate for the formal certification A and an electronic certificate for the formal certification B are issued by Certificate Authority (CA: Certificate Authority) and has a public key or electronic-signature of the Certificate Authority.

The temporary certificate A is the temporary certificate of which the temporary certification server A30 issued. The temporary certificate B is the temporary certificate of which the temporary certification server B50 issued. More information about the temporary certificate A and the temporary certificate B will be explained later.

(Reference Origin Server)

Figure 4:
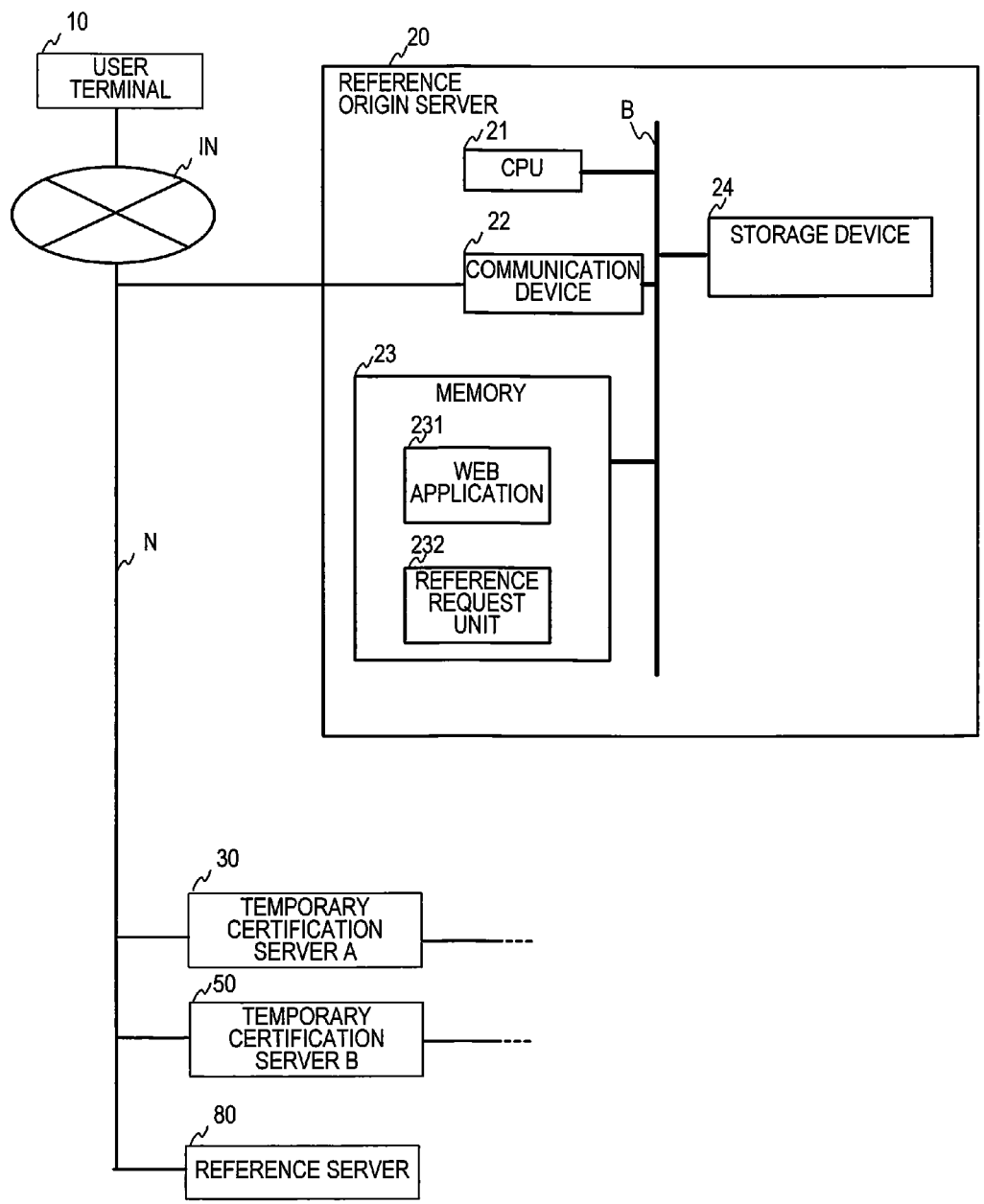
FIG. 4 is a hardware block diagram of the reference origin server 20 depicted by FIG. 1.

FIG. 4 is a hardware block diagram of the reference origin server 20 depicted by FIG. 1. The reference origin server 20 includes a CPU 21, a communication device 22, a memory 23 and a storage device 24 which are connected mutually through a bus B, for example.

The CPU 21 is a computer controlling the whole of the reference origin server 20. The communication device 22 is a device which connects with network N and communicates the user terminal 10, the temporary certification server A30, the temporary certification server B50, and the reference server 80. The communication device 22 is so-called NIC (Network Interface Card). The memory 23 memorizes data and various programs, which are processed in various information processing that the CPU 21 carries out, temporarily.

The Web application 231 and the reference request unit 232, which are explained in FIG. 1, are so-called programs, and, for example, this program is stored to the storage device 24. The CPU 21 retrieves these programs from the storage device 24 at the time of start, and develops it in the memory 23 to functionalize these programs as a software module.

The storage device 24 is, for example, a magnetic storage device and nonvolatile storage device and stores the above program and various data.

(Temporary Certification Server A)

Figure 5:
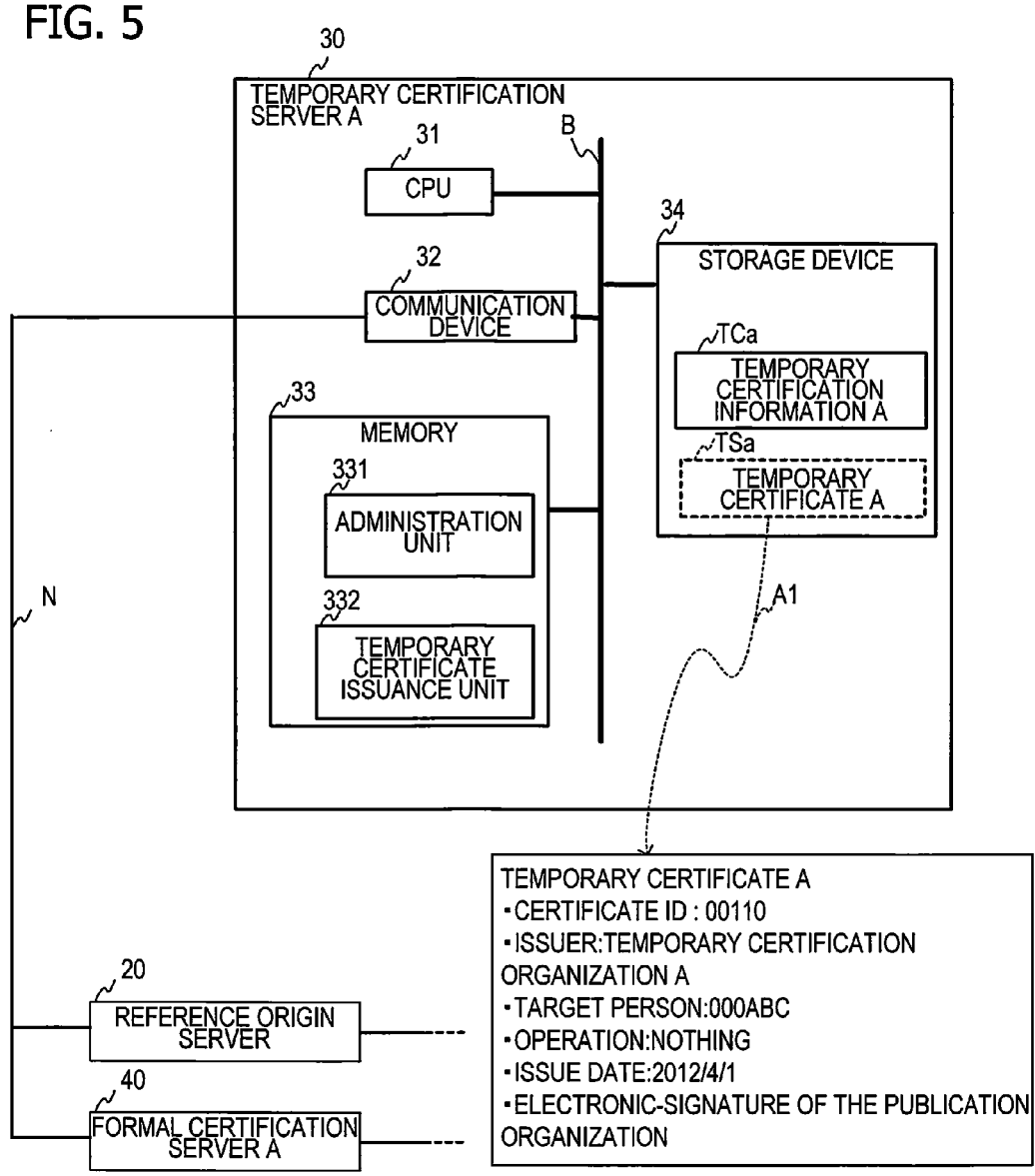
FIG. 5 is a hardware block diagram of the temporary certification server A30 in FIG. 1.

FIG. 5 is a hardware block diagram of the temporary certification server A30 in FIG. 1. The temporary certification server A30 includes a CPU 31, a communication device 32, a memory 33 and a storage device 34 which are connected mutually through a bus B, for example.

The CPU 31 is a computer controlling the whole of the temporary certification server A30. The communication device 32 is a device which connects with the network N and communicates with the reference origin server 20 and the formal certification server A40. The communication device 32 is so-called NIC (Network Interface Card). The memory 33 memorizes data and various programs, which are processed in various information processing that the CPU 31 carries out, temporarily.

The administration unit 331 and the temporary certificate issuance unit 332, which are illustrated by FIG. 1, are so-called programs, and, for example, this program is stored to the storage device 34. The CPU 31 retrieves these programs from the storage device 34 at the time of start, and develops it in the memory 33 to functionalize these programs as a software module.

The storage device 34 is, for example, a magnetic storage device and nonvolatile storage device and stores the above program and various data. The various data are the temporary certification information A depicted by a reference sign TCa and the temporary certificate A depicted by a reference sign TSa. The temporary certification information A is information which is referred to when the temporary certification A is carried out, and, for example, includes the user ID and a password corresponding to the user ID (identifier). The temporary certificate A is the temporary certificate in which the temporary certificate issuance unit 332 issued. The detailed contents of the temporary certificate A is represented by an arrow A1.

The temporary certificate A has the certificate information, a certificate ID, an issuer, a target person, an operation, an issue date and an electronic-signature of the issue organization, as an item.

The certificate information indicates that the certificate is a temporary certificate. The certificate ID is the ID to distinguish the temporary certificate, and is a unique ID for corresponding the temporary certificate with the formal certificate which corresponds to the temporary certificate (also called as link). The issuer is the issuer of the temporary certificate and is an installer of the first certification server SVA. The target person is a subject person of the temporary certificate, and receives the certification. The subject person is indicated by the user ID, for example. The operation indicates the authority of the processing contents, when the certification indicates the authorization for one processing. The temporary proof A relates to the first certification to perform person proof. Here, the operation is with "nothing", because the first certification does not indicate to the authorization. The issue date is the date when the temporary certificate is issued. The electronic-signature of the issue organization is electronic-signature to secure the validity of the temporary certificate and is the electronic-signature that the issuer provides.

The temporary certificate A indicated by a reference sign TSa has "temporary certificate A" as the certificate information, "00110" as the certificate ID, "the temporary certification organization A" as the issuer, "000ABC" as a target person, "nothing" as the operation and "2012/4/1" as the issue date, depicted by an arrow A1. Furthermore, the temporary certificate A depicted by the reference sign TSa has the electronic-signature of the issue organization.

In addition, the administration unit 331 may delete the temporary certificate A indicated by the reference sign TSa which is represented by a dotted line after transmitting it to the reference origin server 20.

(Formal Certification Server A)

Figure 6:
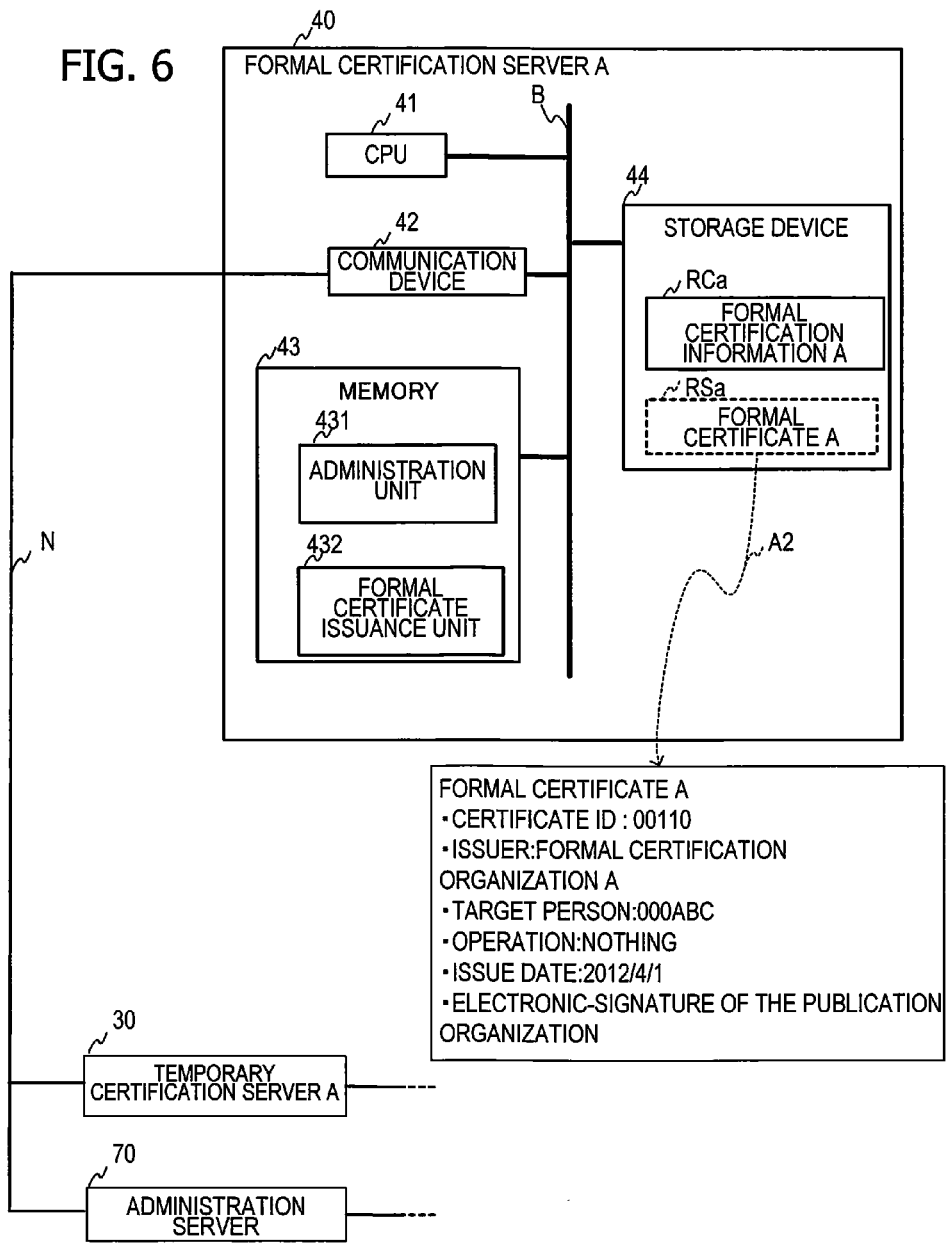
FIG. 6 is a hardware block diagram of the formal certification server A40 in FIG. 1.

FIG. 6 is a hardware block diagram of the formal certification server A40 in FIG. 1. The formal certification server A40 includes a CPU 41, a communication device 42, a memory 43 and a storage device 44 which are connected mutually through a bus B, for example.

The CPU 41 is a computer controlling the whole of the formal certification server A40. The communication device 42 is a device which connects with the network N and communicates with the temporary certification server A30 and the administration server 70. The communication device 42 is so-called NIC (Network Interface Card). The memory 43 memorizes data and various programs, which are processed in various information processing that the CPU 41 carries out, temporarily.

The administration unit 431 and the formal certificate issuance unit 432, which are illustrated by FIG. 1, are so-called programs, and, for example, this program is stored to the storage device 44. The CPU 41 retrieves these programs from the storage device 44 at the time of start, and develops it in the memory 43 to functionalize these programs as a software module.

The storage device 44 is, for example, a magnetic storage device and nonvolatile storage device and stores the above program and various data. The various data are the formal certification information A depicted by a reference sign RCa and the formal certificate A depicted by a reference sign RSa. The formal certification information A is information which is referred to when the formal certification A is carried out, and also called as a security policy. The formal certificate A is the formal certificate in which the formal certificate issuance unit 432 issued. The detailed contents of the formal certificate A is represented by an arrow A2.

The formal certificate A has the certificate information, a certificate ID, an issuer, a target person, an operation, an issue date and an electronic-signature of the issue organization, as an item. The certificate information indicates that the certificate is a formal certificate. The certificate ID is the ID to distinguish the formal certificate, and is a unique ID for corresponding the formal certificate with the temporary certificate which corresponds to the formal certificate. That is, the certificate ID of the formal certificate A is same as the certificate ID of the temporary certificate A. The issuer is the issuer of the formal certificate and is an installer of the first certification server SVA. The target person is a subject person of the formal certificate, and receives the certification. The subject person is indicated by the user ID, for example. The operation indicates the authority of the processing contents of which the user has, when the certification indicates the authorization for one processing. The formal proof A relates to the first certification to perform person proof. Here, the operation is with "nothing", because the first certification does not indicate to the authorization. The issue date is the date when the formal certificate is issued. The electronic-signature of the issue organization is electronic-signature to secure the validity of the formal certificate and is the electronic-signature that the issuer provides.

The formal certificate A indicated by a reference sign RSa has "formal certificate A" as the certificate information, "00110" as the certificate ID, "the formal certification organization A" as the issuer, "000ABC" as target person, "nothing" as the operation and "2012/4/1" as the issue date, depicted by an arrow A2. Furthermore, the formal certificate A depicted by the reference sign RSa has the electronic-signature of the issue organization.

In addition, the administration unit 631 may delete the formal certificate A indicated by the reference sign RSa which is represented by a dotted line after transmitting it to the administration server 70.

(Temporary Certification Server B)

Figure 7:
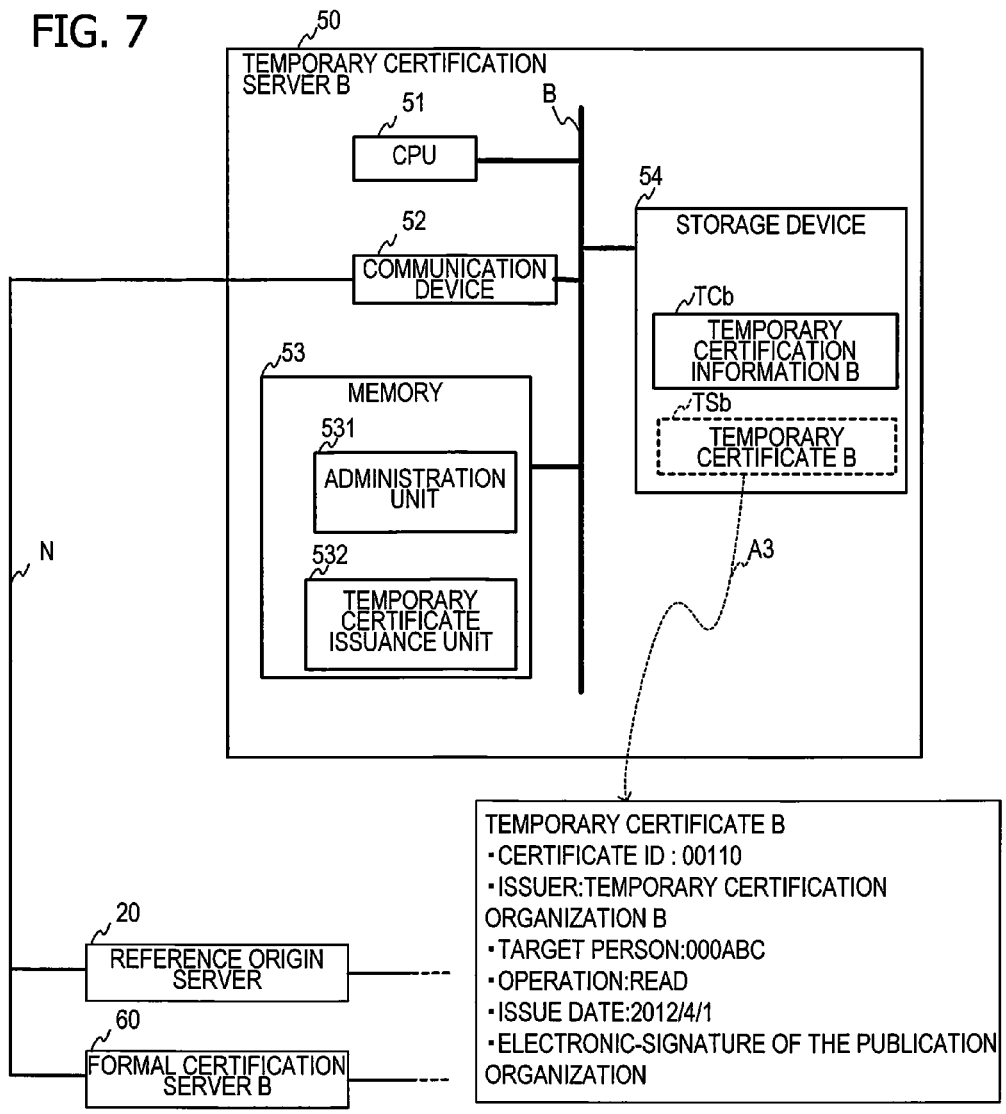
FIG. 7 is a hardware block diagram of the temporary certification server A50 in FIG. 1.

FIG. 7 is a hardware block diagram of the temporary certification server A50 in FIG. 1. The temporary certification server A50 includes a CPU 51, a communication device 52, a memory 53 and a storage device 54 which are connected mutually through a bus B, for example.

The CPU 51 is a computer controlling the whole of the temporary certification server A50. The communication device 52 is a device which connects with the network N and communicates with the reference origin server 20 and the formal certification server B60. The communication device 52 is so-called NIC (Network Interface Card). The memory 53 memorizes data and various programs, which are processed in various information processing that the CPU 51 carries out, temporarily.

The administration unit 531 and the temporary certificate issuance unit 532, which are illustrated by FIG. 1, are so-called programs, and, for example, this program is stored to the storage device 54. The CPU 51 retrieves these programs from the storage device 54 at the time of start, and develops it in the memory 53 to functionalize these programs as a software module.

The storage device 54 is, for example, a magnetic storage device and nonvolatile storage device and stores the above program and various data. The various data are the temporary certification information B depicted by a reference sign TCb and the temporary certificate B depicted by a reference sign TSb. The temporary certification information B is information which is referred to when the temporary certification B is carried out, and, for example, includes the user ID and a password corresponding to the user ID (identifier). The temporary certificate B is the temporary certificate in which the temporary certificate issuance unit 532 issued. The detailed contents of the temporary certificate B is represented by an arrow A3.

The temporary certificate B has same items as the items of the temporary certificate A. Here, the operation indicates the authority of the processing contents in which the user has, when the certification indicates the authorization for one processing. Here, the second certification which performs the authorization includes the admission. The operation contents as below are designated by the authorization organization (temporary certification server B50), as the authority of processing contents, because the temporary certification B relates to the second certification. For example, when the processing contents indicate any processing for some data, any one of read, write and delete are designated by the authorization organization as the operation. The read means that the target person of the temporary certificate has only an authority to read the data. The write means that the target person of the temporary certificate has the authority to write in addition to read. The delete means that the target person of the temporary certificate has the authority to delete in addition to write. In addition, the operation is "nothing" when the processing contents do not indicate any process.

The temporary certificate B indicated by a reference sign TSb has "temporary certificate B" as the certificate information, "00111" as the certificate ID, "the temporary certification organization B" as the issuer, "000ABC" as a target person, "read" as the operation and "2012/4/1" as the issue date, depicted by an arrow A3. Furthermore, the temporary certificate B has the electronic-signature of the issue organization.

In addition, the administration unit 531 may delete the temporary certificate B indicated by the reference sign TSb which is represented by a dotted line after transmitting it to the reference origin server 20.

(Formal Certification Server B)

Figure 8:
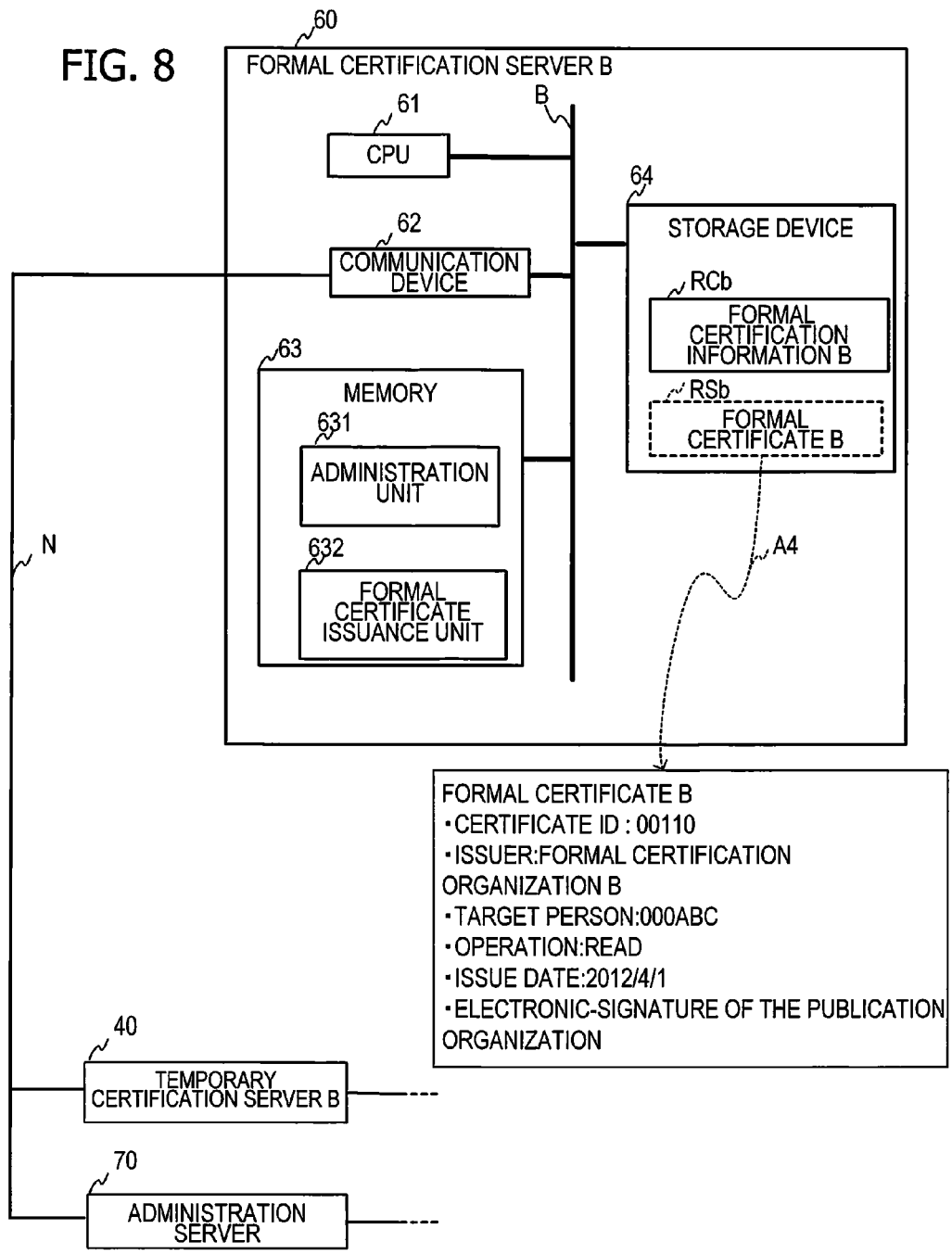
FIG. 8 is a hardware block diagram of the formal certification server B60 in FIG. 1.

FIG. 8 is a hardware block diagram of the formal certification server B60 in FIG. 1. The formal certification server B60 includes a CPU 61, a communication device 62, a memory 63 and a storage device 64 which are connected mutually through a bus B, for example.

The CPU 61 is a computer controlling the whole of the formal certification server B60. The communication device 62 is a device which connects with the network N and communicates with the temporary certification server B50 and the administration server 70. The communication device 62 is so-called NIC (Network Interface Card). The memory 63 memorizes data and various programs, which are processed in various information processing that the CPU 61 carries out, temporarily.

The administration unit 631 and the formal certificate issuance unit 632, which are illustrated by FIG. 1, are so-called programs, and, for example, this program is stored to the storage device 64. The CPU 61 retrieves these programs from the storage device 64 at the time of start, and develops it in the memory 63 to functionalize these programs as a software module.

The storage device 64 is, for example, a magnetic storage device and nonvolatile storage device and stores the above program and various data. The various data are the formal certification information B depicted by a reference sign RCb and the formal certificate B depicted by a reference sign RSb. The formal certification information B is information which is referred to when the formal certification B is carried out, and also called as a security policy. The formal certificate B is the formal certificate in which the formal certificate issuance unit 632 issued. The detailed contents of the formal certificate B is represented by an arrow A4.

The formal certificate B has same items as the items of the formal certificate A. Here, the operation indicates the authority of the processing contents in which the user has, when the certification indicates the authorization for one processing. Here, the second certification which performs the authorization includes the admission. The operation contents as below are designated by the authorization organization (formal certification server B60), as the authority of processing contents, because the formal certification B relates to the second certification. For example, when the processing contents indicate any processing for some data, any one of read, write and delete are designated by the authorization organization as the operation. The read means that the target person of the temporary certificate has only an authority to read the data. The write means that the target person of the temporary certificate has the authority to write in addition to read. The delete means that the target person of the temporary certificate has the authority to delete in addition to write. In addition, the operation is "nothing" when the processing contents do not indicate any process.

The formal certificate B indicated by a reference sign RSb has "formal certificate B" as the certificate information, "00111" as the certificate ID, "the formal certification organization B" as the issuer, "000ABC" as a target person, "read" as the operation and "2012/4/1" as the issue date, depicted by an arrow A4. Furthermore, the formal certificate B has the electronic-signature of the issue organization.

In addition, the administration unit 631 may delete the formal certificate B indicated by the reference sign RSb which is represented by a dotted line after transmitting it to the administration server 70.

(Administration Server)

Figure 9:
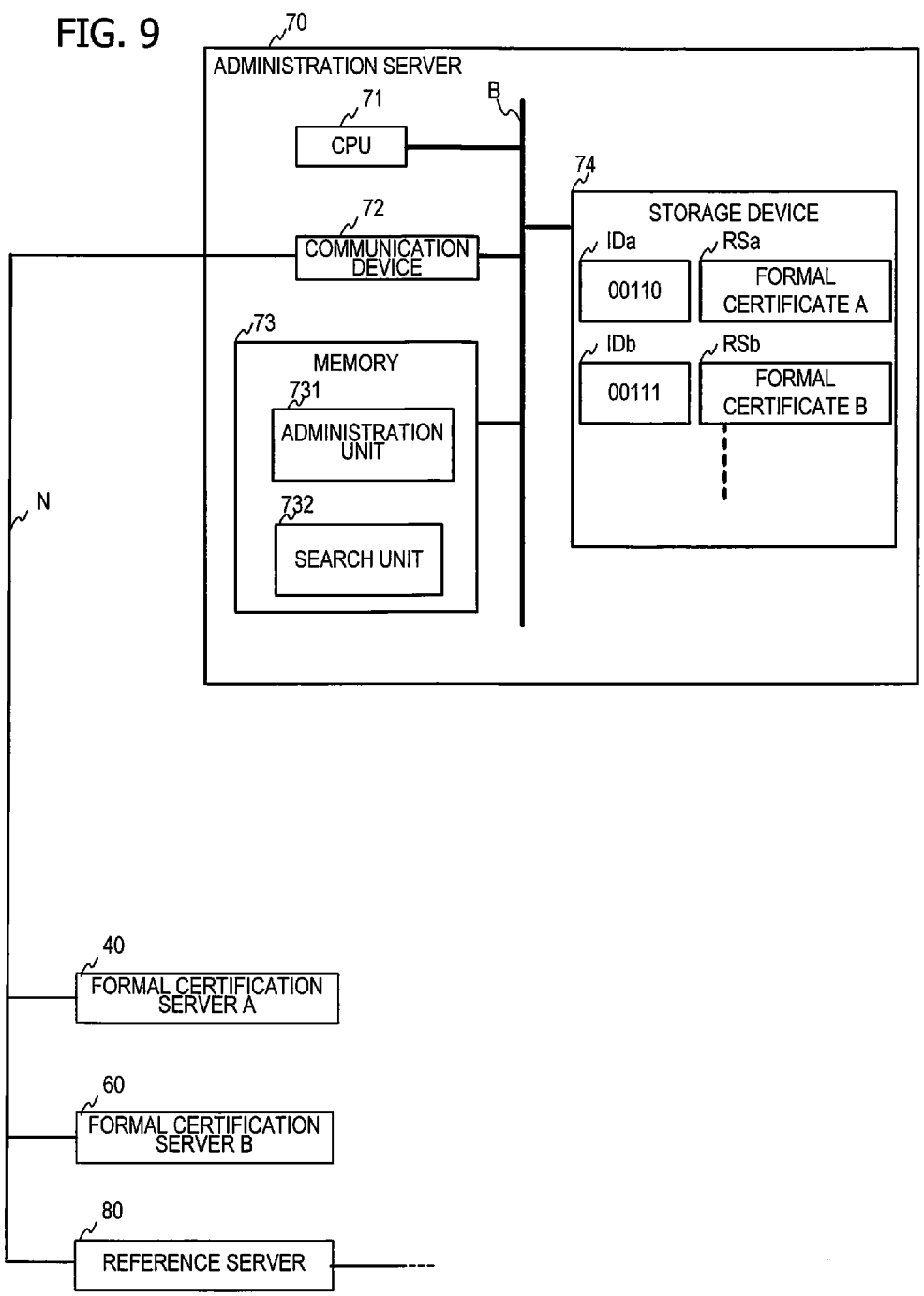
FIG. 9 is a hardware block diagram of the administration server 70 in FIG. 1.

FIG. 9 is a hardware block diagram of the administration server 70 in FIG. 1. The administration server 70 includes a CPU 71, a communication device 72, a memory 73 and a storage device 74 which are connected mutually through a bus B, for example.

The CPU 71 is a computer controlling the whole of the administration server 70. The communication device 72 is a device which connects with the network N and communicates with the formal certification server A40, the formal certification server B60, the reference server 80. The communication device 72 is so-called NIC (Network Interface Card). The memory 73 memorizes data and various programs, which are processed in various information processing that the CPU 71 carries out, temporarily.

The administration unit 731 and the search unit 732 are so-called programs, and, for example, this program is stored to the storage device 74. The CPU 71 retrieves these programs from the storage device 74 at the time of start, and develops it in the memory 73 to functionalize these programs as a software module.

The storage device 74 is, for example, a magnetic storage device and nonvolatile storage device and stores the above program and various data. The various data are the formal certificate A marked by a reference sign RSa, "00110" marked by reference sign IDa, the formal certificate B marked by reference sign RSb, and "00111" marked by reference sign IDb, for example. In addition, "00110" marked by the reference sign IDa indicates to the certificate ID of the formal certificate A, and "00111" marked by the reference sign IDb indicates to the certificate ID of the formal certificate B.

(Reference Server)

Figure 10:
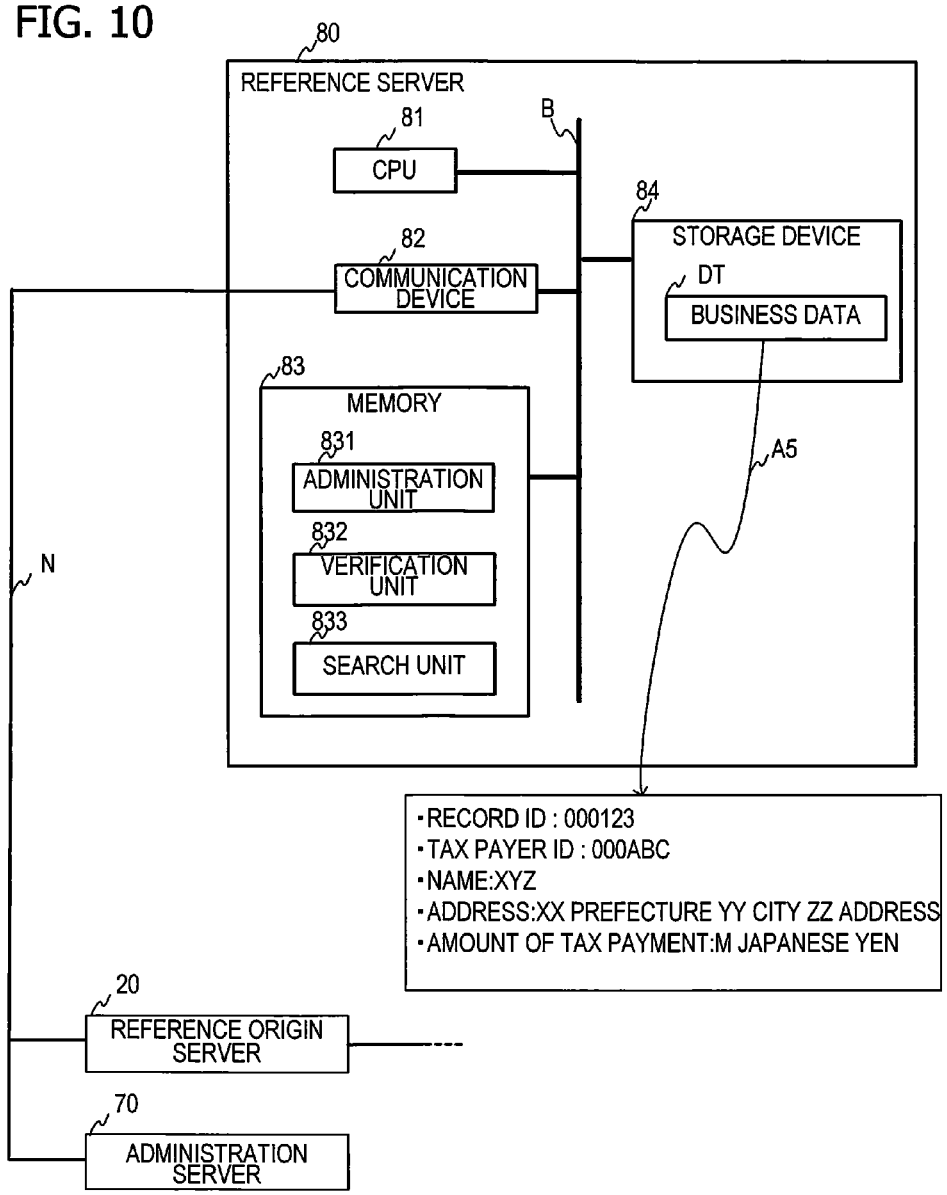
FIG. 10 is a hardware block diagram of the reference server 80 in FIG. 1

FIG. 10 is a hardware block diagram of the reference server 80 in FIG. 1. Reference server 80 includes a CPU 81, a communication device 82, a memory 83 and a storage device 84 which are connected mutually through a bus B, for example.

The CPU 81 is a computer controlling the whole of the reference server 80. The communication device 82 is a device which connects with the network N and communicates with the reference origin server 20 and the administration server 70. The communication device 82 is so-called NIC (Network Interface Card). The memory 83 memorizes data and various programs, which are processed in various information processing that the CPU 81 carries out, temporarily.

The administration unit 831, the verification unit 832 and the search unit 833 are so-called programs, and, for example, this program is stored to the storage device 84. The CPU 81 retrieves these programs from the storage device 84 at the time of start, and develops it in the memory 83 to functionalize these programs as a software module.

The storage device 84 is, for example, a magnetic storage device and nonvolatile storage device and stores the above program and various data. The various data are business data represented by reference sign DT, for example. When the reference server 80 has, for example, tax payment recorded data as reference data, the business data DT is this tax payment recorded data. The tax payment recorded data has a large number of records, and, one single record has, for example, an ID to distinguish a record, a tax payer ID to distinguish a tax payer, a full name, an address, amount of tax payment of the tax payer. The ID to distinguish the tax payer is the user ID. The single record represented by an arrow A5 has "000123" as the record ID, "000ABC" as the tax payer ID, "XYZ" as a full name of the tax payer, "XX prefecture YY city ZZ address" as an address of the tax payer, and "M Japanese yen" as the amount of tax payment of the tax payer.

(Flow of the Processing that a User Terminal Carries Out)

Figure 11:
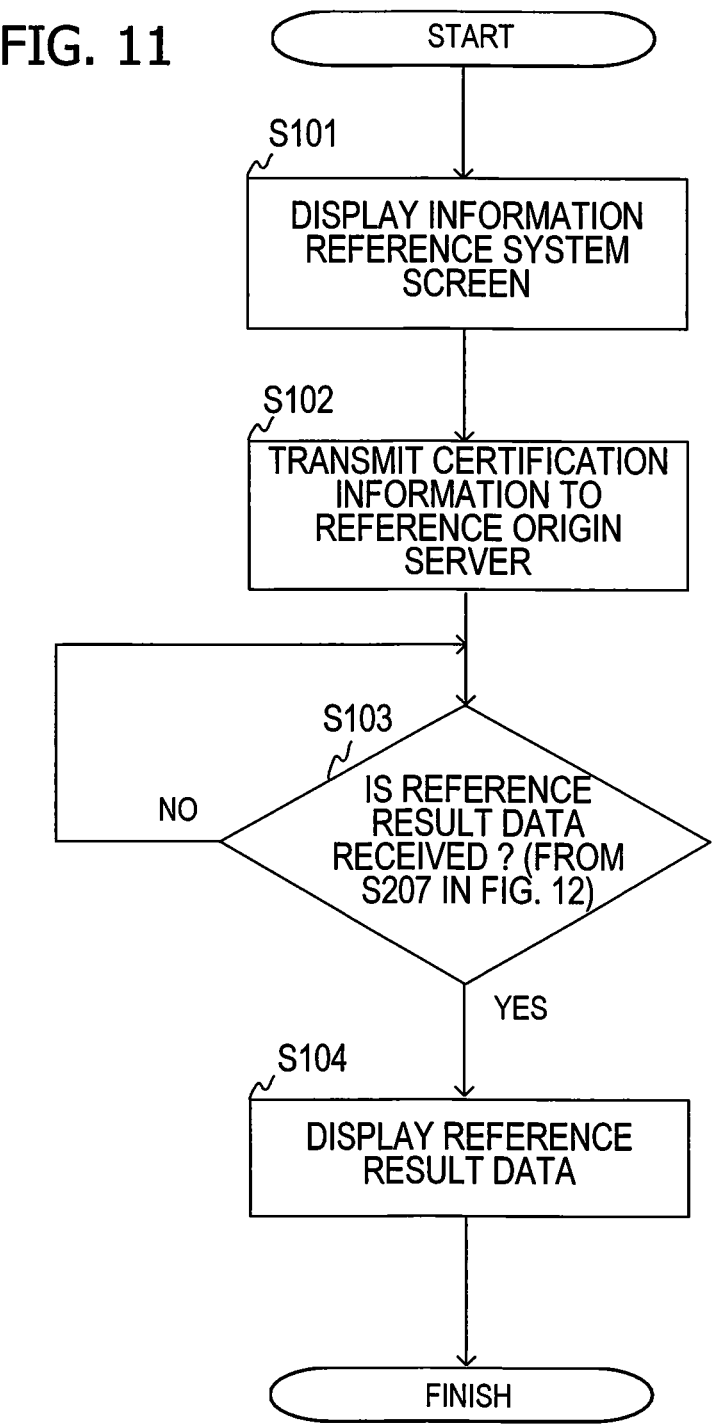
FIG. 11 is a flow diagram to explain an example of the flow of the process of which the user terminal 10 carries out in FIG. 3.

FIG. 11 is a flow diagram to explain an example of the flow of the process of which the user terminal 10 carries out in FIG. 3. With reference to FIG. 1-FIG. 3, and FIG. 11, a flow of the process, that the user terminal 10 carries out in FIG. 3, will be explained.

Step S101: The administration unit 151 in the user terminal 10 displays a reference (inquiry) request screen to the display device 121. The reference request screen has, for example, a text box for user ID input, a text box for password input, and a reference button. Specifically, the administration unit 151 in the user terminal 10 communicates with the Web application 231 in the reference origin server 20 in FIG. 4 and carries out the transmission request of the reference request screen data. The Web application 231 in the reference origin server 20 transmits the reference request screen data to the administration unit 151 in the user terminal 10 in response to this transmission request. The administration unit 151 in the user terminal 10 receives the reference request screen data and, based on the data which is received, displays the reference request screen to the display device 121. The reference request screen data are the data which are described, for example, in HTML (HyperText Markup Language) form and XML (Extensible Markup Language) form.

Step S102: The administration unit 151 includes input user ID and a password in the first certification information of the certification information (referring to the reference sign INF) in the storage device 16 and transmits the above certification information to the Web application 231 in the reference origin server 20. Specifically, the user operates a keyboard in the operation device 131 and inputs the user ID into the text box for user ID input and inputs a password into the text box for password input in the reference request screen. The user ID is an ID to distinguish a user uniquely and, for example, is "000ABC".

And the user operates a mouse of operation device 131, and clicks the reference button. Then the administration unit 151 creates a reference request message including the certification information. As explained by FIG. 3, the administration unit 151 creates the above certification information which includes the first certification information and the second certification information of the certification information INF corresponding to the input user ID, the input user ID and the password. In this time, the administration unit 151 creates the first certification information which includes the input user ID and the password. In other words, the certification information of the reference request message has the first certification information, the second certification information, the input user ID and a password. Furthermore, the administration unit 151 gives, for example, electronic-signature for the reference request message by the public key methods such as RSA (Rivest Shamir Adleman) codes. This electronic-signature is provided for preventions of the forgery and the falsification of the reference request message. The administration unit 151 transmits the reference request message to the Web application 231 in the reference origin server 20. The reference request message is a certification request in step S1 of FIG. 2.

As illustrated by step S102 and FIG. 3, the certification information that the user terminal 10 transmits has the first certification information and the second certification information. The first certification information includes the user ID and a password (corresponding to input user ID and a password) for the temporary certification A and the electronic certificate for the formal certification A. The second certification information has an electronic certificate for the formal certification B.

Step S103: The administration unit 151 determines whether or not received the reference result data for the display from the reference origin server 20. The reference origin server 20 transmits the reference result data for the display to the user terminal 10 by an execution of step S207 in FIG. 12. In step S103, the user is in condition to be waiting the reception of the reference result data for the display. When the administration unit 151 does not receive the reference result data for the display from the reference origin server 20 (NO/step S103), the administration unit 151 continues process of step S103. When the administration unit 151 receives the reference result data for the display from the reference origin server 20 (step S103/YES), the process moves to step S104.

Step S104: When the administration unit 151 receives the reference result data for the display, the administration unit 151 displays the reference result data to the display device 121. In addition, the Step S103 and the step S104 are equivalent to the step S19 in FIG. 2.

(Flow of the Processing that Reference Origin Server Carries Out)

Figure 12:
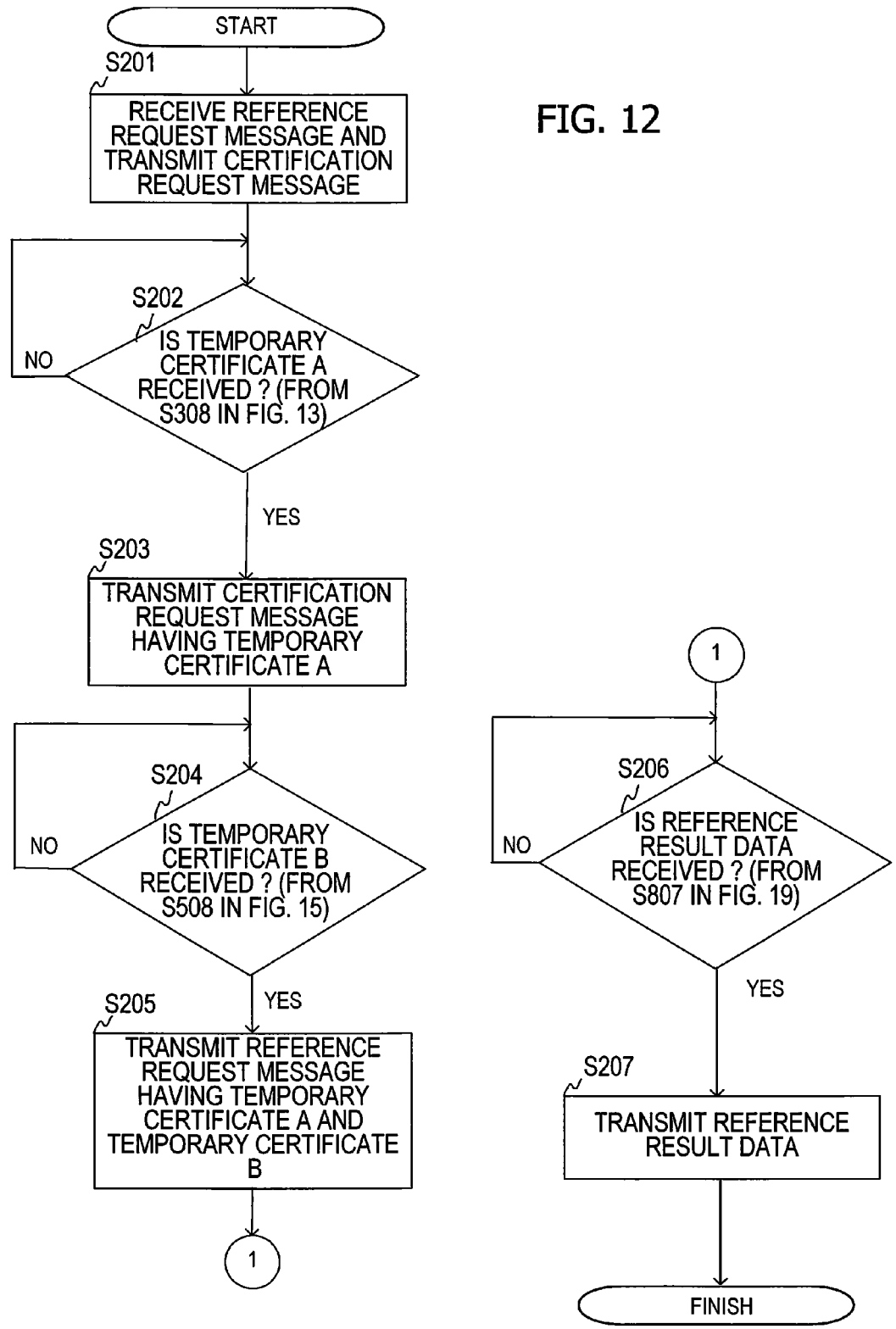
FIG. 12 is a flow diagram to explain an example of the flow of the process that the reference origin server 20 in FIG. 4 carries out.

FIG. 12 is a flow diagram to explain an example of the flow of the process that the reference origin server 20 in FIG. 4 carries out. With reference to FIG. 1, FIG. 2, FIG. 4 and FIG. 12, a flow of the processes, in which the reference origin server 20 in FIG. 4 carries out, will be explained.

Step S201: The reference request unit 232 in the reference origin server 20 receives the reference request message including the certification information which is received from the user terminal 10 and requests a certification to the temporary certification server A30. Specifically, the reference request unit 232 transmits the certification request message including the request ID and the certification information to the temporary certification server A30. When transmitting the certification request message, the reference request unit 232 gives electronic-signature to the certification request message. The step S101 and the step S102 in FIG. 11 and the step S201 in FIG. 12 are equivalent to the step S1 in FIG. 2. After the reference request unit 232 transmitted a certification request message to the temporary certification server A30, the reference request unit 232 waits for the reception of a return (answer) message including the temporary certificate A of which the temporary certification server A30 transmitted by the execution of the step S308 in FIG. 13.

Step S202: The reference request unit 232 determines whether or not received a return message including the temporary certificate A from the temporary certification server A30. When the reference request unit 232 does not receive the return message including the temporary certificate A (step S202/NO), the reference request unit 232 continues the process in the step S202. When the reference request unit 232 receives the return message including the temporary certificate A from the temporary certification server A30 (step S202/YES), the process moves to step S203.

Step S203: The reference request unit 232 transmits the certification request message including the request ID, the certification information which is received from the user terminal 10 and the temporary certificate A which is received from the temporary certification server A30 to the temporary certification server B50. When transmitting the certification request message, the reference request unit 232 gives the electronic-signature to the certification request message. The processes of the step S202 (YES) and the step S203 are equivalent to the step S6 in FIG. 2. After the reference request unit 232 transmitted the certification request message to the temporary certification server B50, the reference request unit 232 waits for the reception of the return message including the temporary certificate B of which the temporary certification server B50 transmitted by the execution of the step S508 in FIG. 15.

Step S204: The reference request unit 232 determines whether or not received the return message including the temporary certificate B from the temporary certification server B50. When the reference request unit 232 does not receive the return message including the temporary certificate B (step S204/NO), the reference request unit 232 continues the process in the step S204. When the reference request unit 232 receives the return message including the temporary certificate B from the temporary certification server B50 (step S204/YES), the process moves to the step S205.

Step S205: The reference request unit 232 creates the reference request message including the temporary certificate A and the temporary certificate B, and transmits it to the reference server 80. The processes of the step S204 (YES) and the step S205 are equivalent to the step S13 in FIG. 2. After the reference request unit 232 transmitted the reference request message to the reference server 80, the reference request unit 232 waits for the reception of the reference result data of which the reference server 80 transmitted by the execution of step S807 in FIG. 19.

Step S206: The reference request unit 232 determines whether or not received the reference result data from the reference server 80. When the reference request unit 232 does not receive the reference result data (step S206/NO), the reference request unit 232 continues the process in the step S206. When the reference request unit 232 receives the reference result data from the reference server 80, the process moves to step S207.

Step S207: The Web application 231 transmits the reference result data for the display to the user terminal 10. Specifically, the reference request unit 232 transmits the reference result data, which is received from the reference server 80, to the Web application 231. The Web application 231 converts it, for example, into the data of the HTML form so as to display the reference result data which is received by a browser. The reference result data after this conversion are reference result data for the display.

The processes of the step S206 (YES) and the step S207 are equivalent to the step S19 in FIG. 2.

In addition, when the reference request unit 232 receives the temporary certificate A (step S202/YES), the reference request unit 232 transmits the temporary certificate A which is received to the user terminal 10 through the Web application 231. Similarly when the reference request unit 232 receives the temporary certificate B (step S204/YES), the reference request unit 232 transmits the temporary certificate B which is received to the user terminal 10 through the Web application 231. The administration unit 151 in the user terminal 10 stores the temporary certificate A and the temporary certificate B which are received to the storage device 16 (referring to the marks TSa and TSb in FIG. 3).

In addition, the Web application 231 notifies the user terminal 10 that the reference request failed, when the Web application 231 receives a failure (unsuccessful) message from the temporary certification server A30, the temporary certification server B50 and the reference server 80. When the administration unit 151 in the user terminal 10 receives the above notice, the administration unit 151 displays a reference request failed to the display device 121.

(Flow of the Processing that Temporary Certification Server a Carries Out)

Figure 13:
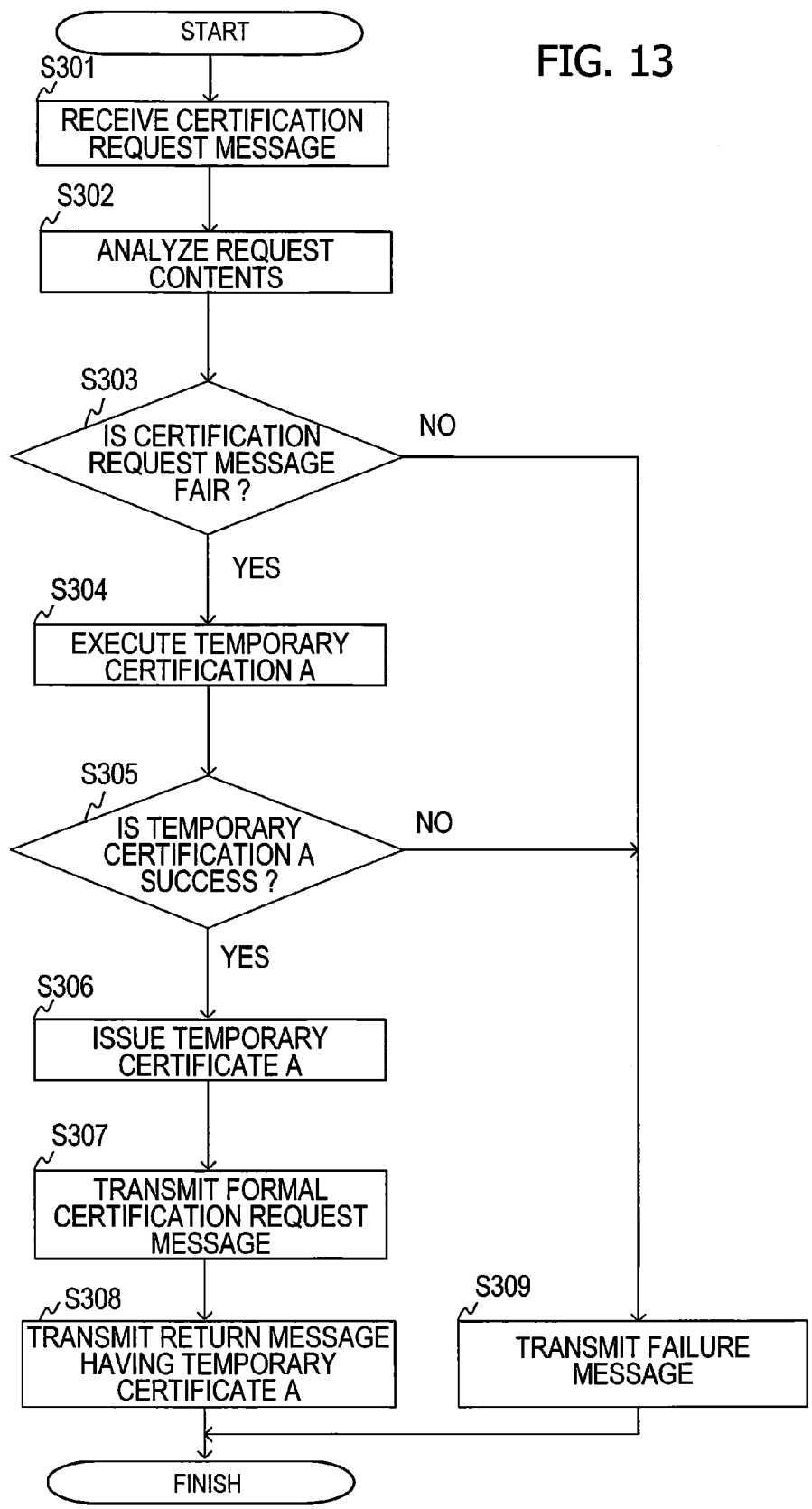
FIG. 13 is a flow diagram to explain an example of the flow of the process of which the temporary certification server A30 in FIG. 5 carries out.

FIG. 13 is a flow diagram to explain an example of the flow of the process of which the temporary certification server A30 in FIG. 5 carries out. With reference to FIG. 1, FIG. 2, FIG. 5 and FIG. 13, a flow of the process of which the temporary certification server A30 in FIG. 5 carries out.

Step S301: The administration unit 331 in the temporary certification server A30 receives the certification request message transmitted from the reference origin server 20 and stores it in the memory 33. The administration unit 331 stores this certification request message with cue structure in the memory 33. The reference origin server 20 transmits the certification request message by execution of step S201 in FIG. 12.

Step S302: The administration unit 331 analyzes the contents of the request from the certification request message. Because the message has the request ID and the certification information, the administration unit 331 analyzes that the contents of the request is certification request, and moves to step S303.

Step S303: The administration unit 331 verifies the electronic-signature which is given to the certification request message and determines whether the certification request message is fair or not. Here, when the certification request message is fair, it indicates that a third party does not forgery and falsify the certification request message. When the certification request message is fair (step S303/YES), the process moves to step S304.

Step S304: The temporary certificate issuance unit 332 carries out the temporary certification A, based on the user ID and the password of the certification information that the certification request message has. Here, the temporary certificate issuance unit 332 carries out the temporary certification A, based on the user ID and the password, of which the certification information of the certification request message has, and the user ID and the password in the temporary certification information A which are stored in the storage device 34 beforehand and indicated by a mark TCa, and determines whether both are matched with. Because this temporary certification is the simple password certification, the processing time has a shorter than that of the formal certification.

Here, a case that the both are matched with is described as success of the temporary certification and a case that the both are not matched with is described as failure (unsuccessful) of the temporary certification appropriately. When the temporary certification succeeds, the process moves to step S305.

Step S305: The temporary certificate issuance unit 332 determines whether the temporary certification A succeeded or failed. When the temporary certification succeeds (step S305/YES), the process moves to step S306.

Step S306: The temporary certificate issuance unit 332 issues the temporary certificate A. Specifically, the temporary certificate issuance unit 332 decides the temporary certificate ID of the temporary certificate A first, and temporary certificate issuance unit 332 determines that the contents of each item of temporary certificate A are the above temporary certificate ID, an issuer of the temporary certificate A, a target person, an operation, an issue date and the electronic-signature of the issue organization. This target person is the user ID in the certification information which is received. In the example of FIG. 5, the temporary certificate issuance unit 332 decides the temporary certificate ID with "00110". In addition, the user ID is "000ABC" of the certification information which is received. In addition, the operation becomes "nothing" because the temporary certification A is the person certification. More information on the temporary certificate A are referred to the mark TSa in FIG. 5.

In addition, the step S301-step S306 are equivalent to the step S2 in FIG. 2.

Step S307: The administration unit 331 creates the formal certification request message including the request ID, certificate ID of the temporary certificate A and certification information, and transmits it to the formal certification server A40. The certification information is the information that the certification request message has, and has at least the user ID and an electronic certificate for the formal certification A. In addition, the administration unit 331 transmits the formal certification request message which is added the electronic-signature to the formal certification server A40.

The step S307 is equivalent to the step S3 in FIG. 2.

Step S308: The administration unit 331 creates the return message including the temporary certificate A, and transmits it to the reference origin server 20. In addition, the administration unit 331 transmits the return message which is added the electronic-signature to the reference origin server 20. The step S308 is equivalent to the step S5 in FIG. 2.

In addition, when the certification request message is not fair (S303/NO) and when the temporary certification fails in step S305 (step S305/NO), the process moves to step S309.

Step S309: The administration unit 331 transmits a failure message to the reference origin server 20.

Here, it is preferable that the temporary certificate issuance unit 332 decides the certificate ID of the temporary certificate A beforehand before a start of execution in step S304. And the administration unit 331 creates the formal certification request message including the request ID and the certificate ID and the certification information of above determined temporary certificate A, with a start of execution of step S304 or before the start of execution of step S304, and transmits it to the formal certification server A40 (referring to step S307). In this case, the temporary certificate issuance unit 332 does not carry out the decision of the temporary certificate ID of temporary certificate A, and makes the above determined temporary certificate ID with the temporary certificate ID of the temporary certificate A in step S306. In addition, in this case, the administration unit 331 does not carry out the creation of the formal certification request message and the transmission processing in step S307, because the administration unit 331 already carried out the creation of the formal certification request message and the transmission processing.

By this processing, a start of execution of the formal certification A becomes simultaneous with a start of execution of the temporary certification A. And it is possible to execute (carry out) the formal certification A in the background during the execution of the temporary certification A.

(Flow of the Processing that Formal Certification Server a Carries Out)

Figure 14:
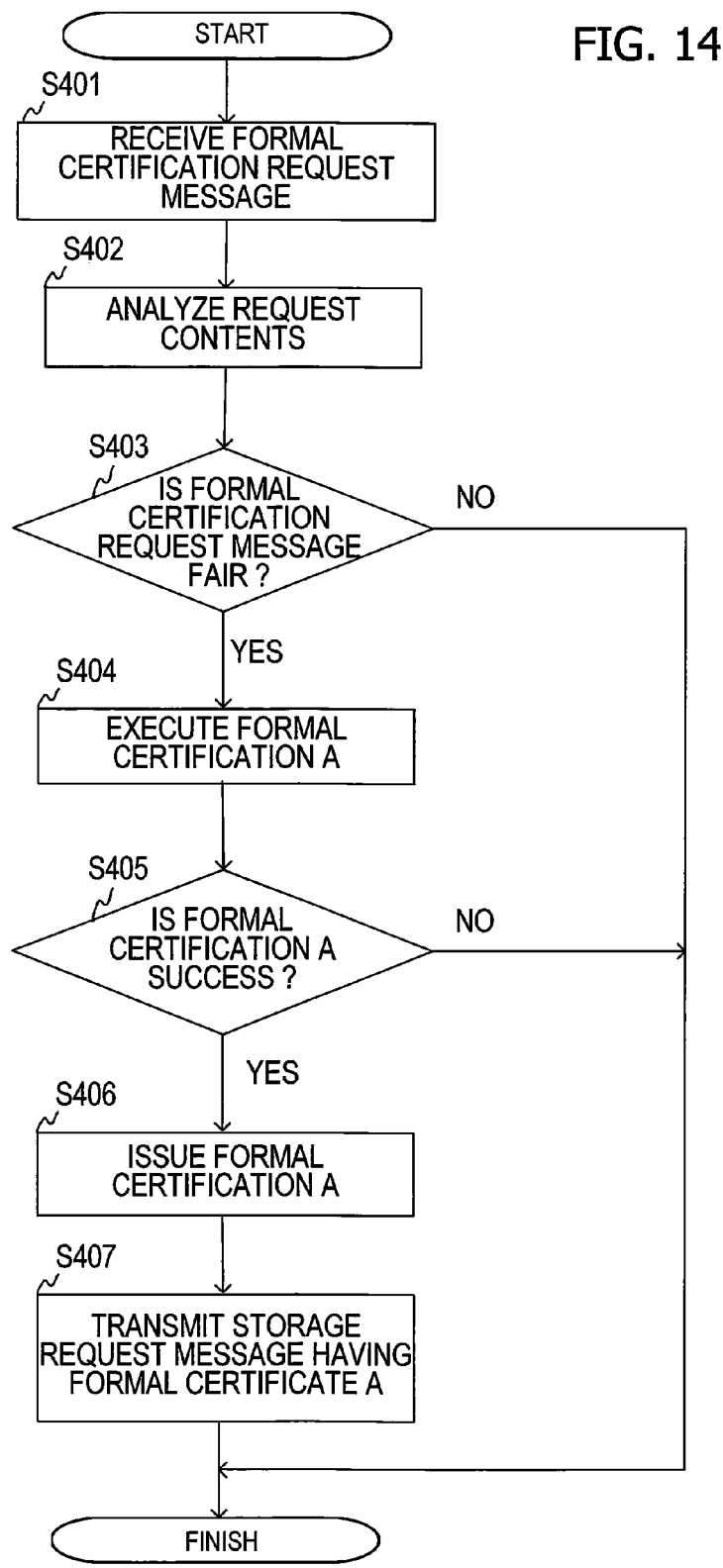
FIG. 14 is a flow diagram to explain an example of the flow of the process of which the formal certification server A40 in FIG. 6 carries out.

FIG. 14 is a flow diagram to explain an example of the flow of the process of which the formal certification server A40 in FIG. 6 carries out. With reference to FIG. 1, FIG. 2, FIG. 6 and FIG. 14, a flow of the process of which the formal certification server A40 in FIG. 6 carries out.

Step S401: The administration unit 431 in the formal certification server A40 receives the formal certification request message transmitted by the temporary certification server A30 and stores it in the memory 43. The administration unit 431 stores the formal certification request message with cue structure in the memory 43. The temporary certification server A30 transmits the formal certification request message by the execution of the step S307 in FIG. 13.

Step S402: The administration unit 431 analyzes the contents of the request from the formal certification request message. Because this message has the request ID, the certificated ID of the temporary certificate A and the electronic certificate for the formal certification A, the administration unit 431 analyzes that the contents of the request is the formal certification request, and moves to step S403.

Step S403: The administration unit 431 verifies the electronic-signature which is given to the formal certification request message and determines whether the formal certification request message is a fair or not. Here, when the formal certification request message is fair, it indicates that a third party does not forgery and falsify the formal certification request message. When the formal certification request message is fair (step S403/YES), the process moves to step S404.

Step S404: The formal certificate issuance unit 432 carries out the formal certification based on an electronic certificate (referring to the mark INF in FIG. 3) for the formal certification A in the certification information in which the certification request message has. The formal certificate issuance unit 432 carries out the formal certification based on the electronic certificate for the formal certification A and the formal certification information A which is stored in the storage device 44 and is indicated by the mark RCa. The formal certificate issuance unit 432 carries out, for example, the PKI certification as the formal certification.

In the case of the PKI certification, the formal certification information A includes an access information (for example, URL (Uniform Resource Locator) of the Certificate Authority) to the Certificate Authority which issued an electronic certificate for the formal certification A, for example. When performing the PKI certification as the formal certification A, the formal certificate issuance unit 432 performs the following confirmation processing sequentially, for example. The formal certificate issuance unit 432 decodes the electronic-signature of the Certificate Authority in an electronic certificate for the formal certification A by a public key of the Certificate Authority, and verifies it to confirm validity of the Certificate Authority. The formal certificate issuance unit 432 accesses the Certificate Revocation List of which the Certificate Authority issues and confirms whether or not the above electronic certificate lapsed. Furthermore, the formal certificate issuance unit 432 confirms the expiration date of the above electronic certificate. When the formal certificate issuance unit 432 confirmed that the Certificate Authority is a fair, the electronic certificate does not lapse, the expiration date of the electronic certificate is valid, the formal certificate issuance unit 432 determines that the formal certificate is success. Because the formal certificate issuance unit 432 performs the above confirmation processing sequentially, the processing time of the formal certification A becomes longer in comparison with the processing time of temporary certification which carries simple authenticating.

Step S405: The formal certificate issuance unit 432 determines whether the formal certification succeeded or failed. When the formal certification succeeds (S405/YES), the process moves to step S406.

Step S406: The formal certificate issuance unit 432 issues the formal certificate A. Specifically, the formal certificate issuance unit 432 decides that the temporary certificate ID of the temporary certificate A is the formal certificate ID of the formal certificate A, and decides that a target person of the formal certificate A is the user ID in the certification information of the formal certification request message which is received. The above user ID is the ID that a user input in step S11 of FIG. 11. In addition, a target person of the formal certificate A may be the user ID that an electronic certificate for the formal certification A has. Furthermore, the formal certificate issuance unit 432 determines that the contents of each item of the formal certificate A are the formal certificate ID, the issuer of the formal certificate A, the operation, the issue date and the electronic-signature of the issue organization. In the example of FIG. 6, the formal certificate issuance unit 432 decides the formal certificate ID with "00110" and decides a target person with "000ABC". In addition, the operation becomes "nothing" because the formal certification A is the person certification. The mark RSa in FIG. 6 is referred for more information on the formal certificate A. In addition, the step S401-step S406 are equivalent to the step S4 in FIG. 2.

Step S407: The administration unit 431 creates a storing request message including the formal certificate A, and transmits it to the administration server 70. The step S407 is equivalent to the step S14 in FIG. 2.

In addition, when the formal certification request message is not fair (step S403/NO) and when the formal certification fails in the step S405 (step S405/NO), the processing in step S407 is omitted.

(Flow of the Processing that Temporary Certification Server B Carries Out)

Figure 15:
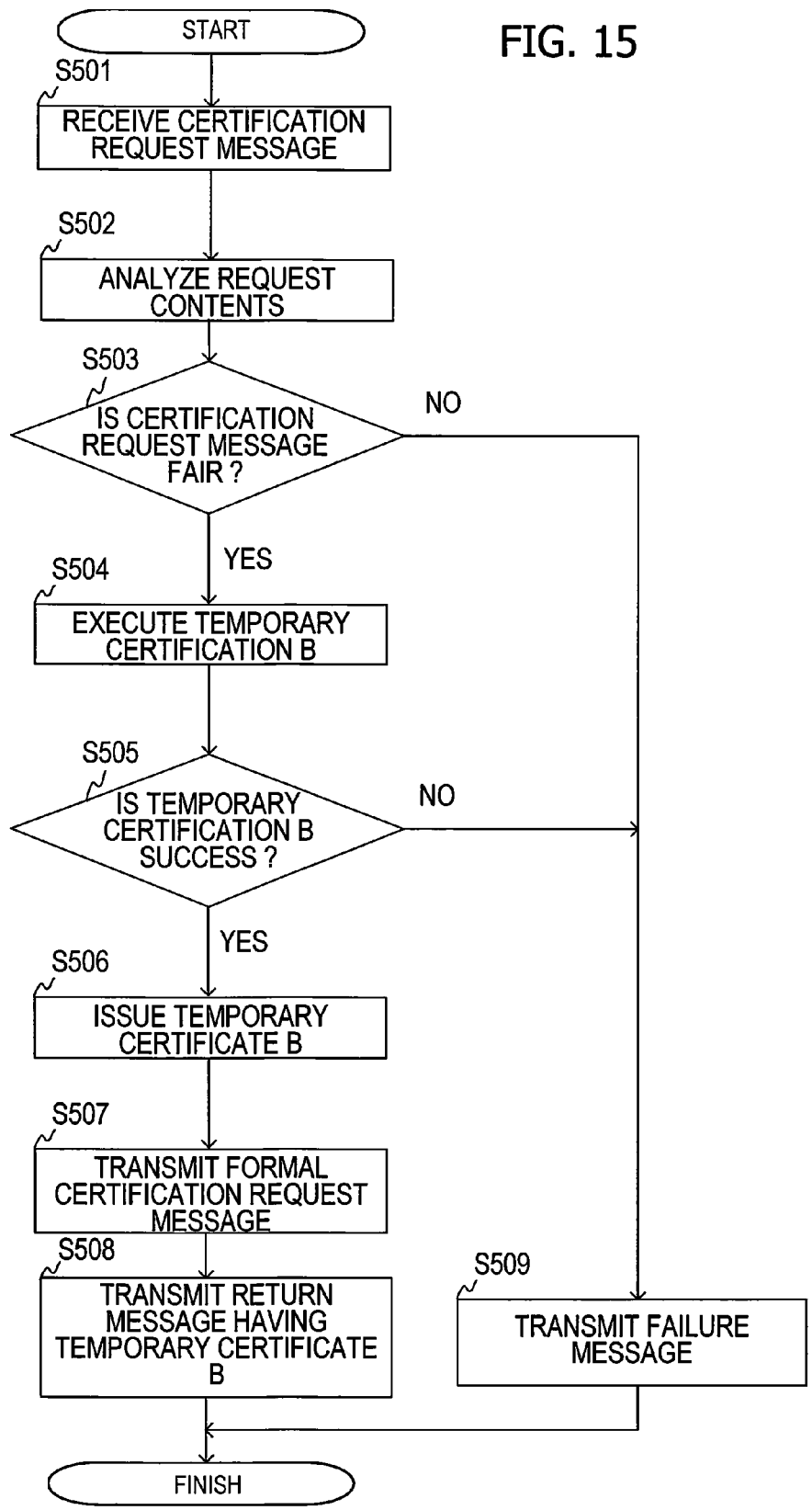
FIG. 15 is a flow diagram to explain an example of the flow of the process of which the temporary certification server B50 in FIG. 7 carries out.

FIG. 15 is a flow diagram to explain an example of the flow of the process of which the temporary certification server B50 in FIG. 7 carries out. With reference to FIG. 1, FIG. 2, FIG. 7 and FIG. 15, a flow of the process of which the temporary certification server B50 in FIG. 7 carries out.

Step S501: The administration unit 531 in the temporary certification server B50 receives the certification request message transmitted from the reference origin server 20 and stores it in the memory 53. The administration unit 531 stores this certification request message with cue structure in the memory 53. The reference origin server 20 transmits the certification request message by execution of step S203 in FIG. 12.

Step S502: The administration unit 531 analyzes the contents of the request from the certification request message. Because this message has the request ID, the certification information and the temporary certificate A, the administration unit 531 analyzes that the contents of the request is certification request, and moves to step S503.

Step S503: The administration unit 531 verifies the electronic-signature which is given to the certification request message and determines whether the certification request message is fair or not. When the certification request message is fair (step S503/YES), the process moves to step S504.

Step S504: The temporary certificate issuance unit 532 carries out the temporary certification B, based on the temporary certification A. Specially, the temporary certificate issuance unit 532 verifies the temporary certification A. The verification of contents of the temporary certificate A is, for example, verification of the expiration date of the temporary certificate A. For example, the temporary certificate issuance unit 532 determines that the temporary certificate A is valid when current month and date (date and time) is within a predetermined time and date from the issue date of the temporary certificate A. Because the temporary certification is simple verification of expiration date, the processing time of temporary certification is enough shorter than the processing time of the formal certification. In addition, as the verification of the contents of the temporary certificate A, it may adopt to verify that the issuer of the temporary certificate A is fair. In this case, The fair issuer of the temporary certificate A is included in the temporary certification information B which is stored in the storage device 54 and indicated by mark TCb. And the temporary certificate issuance unit 532 determines that the issuer of the temporary certificate A is fair when the issuer of the temporary certificate A which is received matches with the issuer in the temporary certification information B.

Further, the temporary certificate issuance unit 532 may carry out the temporary certificate B based on the user ID and the password, of which the certification information of the certification request message has. Here, the temporary certificate issuance unit 532 determines whether the user ID and the password in the certification request message match with the user ID and the password in the temporary certification information B which are stored in the storage device 54 beforehand and indicated by a mark TCb.

Here, a case that the temporary certificate A is fair is described as success of the temporary certification and a case that the temporary certificate A is not fair is described as failure (unsuccessful) of the temporary certification appropriately. When the temporary certification succeeds, the process moves to step S505.

Step S505: The temporary certificate issuance unit 532 determines whether the temporary certification B succeeded or failed. When the temporary certification B succeeds (step S505/YES), the process moves to step S506.

Step S506: The temporary certificate issuance unit 532 issues the temporary certificate B. Specifically, the temporary certificate issuance unit 532 decides the temporary certificate ID of the temporary certificate B first, and temporary certificate issuance unit 532 determines that the contents of each item of temporary certificate B are the above temporary certificate ID, an issuer of the temporary certificate B, a target person, an operation, an issue date and the electronic-signature of the issue organization. This target person is the user ID in the certification information which is received. In the example of FIG. 7, the temporary certificate issuance unit 532 decides the temporary certificate ID with "00111". In addition, the user ID is "000ABC" of the certification information which is received.

Here, the temporary certificate issuance unit 532 stores and administrates the operation contents corresponding to the user ID in the storage device 54 beforehand. In the example of FIG. 7, the temporary certificate issuance unit 532 stores the operation contents "read" corresponding to the user ID "000ABC". In this case, the temporary certification information B may be included the operation contents corresponding to the user ID. That is, when the certification includes an admission for any process, the temporary certification information may be included the operation contents corresponding to the user ID. The temporary certificate B is referred to the mark TSb in FIG. 7 for more detail. In addition, the step S501-step S506 are equivalent to the step S7 in FIG. 2.

Step S507: The administration unit 531 creates the formal certification request message including the request ID, certificate ID of the temporary certificate B and the certification information, and transmits it to the formal certification server B60.

The certification information is the information that the certification request message has, and has at least the user ID and an electronic certificate for the formal certification B. In addition, the administration unit 531 transmits the formal certification request message which is added the electronic-signature to the formal certification server B60. In addition, the step S507 is equivalent to the step S8 in FIG. 2.

Step S508: The administration unit 531 creates the return message including the temporary certificate B, and transmits it to the reference origin server 20. In addition, the administration unit 531 transmits the return message which is added the electronic-signature to the reference origin server 20. The step S508 is equivalent to the step S12 in FIG. 2.

In addition, when the certification request message is not fair (S503/NO) and when the temporary certification fails in step S505 (step S505/NO), the process moves to step S509.

Step S509: The administration unit 531 transmits a failure message to the reference origin server 20.

Here, it is preferable that the temporary certificate issuance unit 532 decides the certificate ID of the temporary certificate B beforehand before a start of execution in step S504. And the administration unit 531 creates the formal certification request message including the request ID and the certificate ID and the certification information of above determined temporary certificate B, with a start of execution of step S504 or before the start of execution of step S504, and transmits it to the formal certification server B60 (referring to step S507). In this case, the temporary certificate issuance unit 532 does not carry out the decision of the temporary certificate ID of temporary certificate B, and makes the above determined temporary certificate ID with the temporary certificate ID of the temporary certificate B in step S506. In addition, in this case, the administration unit 531 does not carry out the creation of the formal certification request message and the transmission processing in step S307, because the administration unit 531 already carried out the creation of the formal certification request message and the transmission processing.

By this processing, a start of execution of the formal certification B becomes simultaneous with a start of execution of the temporary certification B. And it is possible to execute the formal certification B in the background during the execution of the temporary certification B.

(Flow of the Processing that Formal Certification Server B Carries Out)

Figure 16:
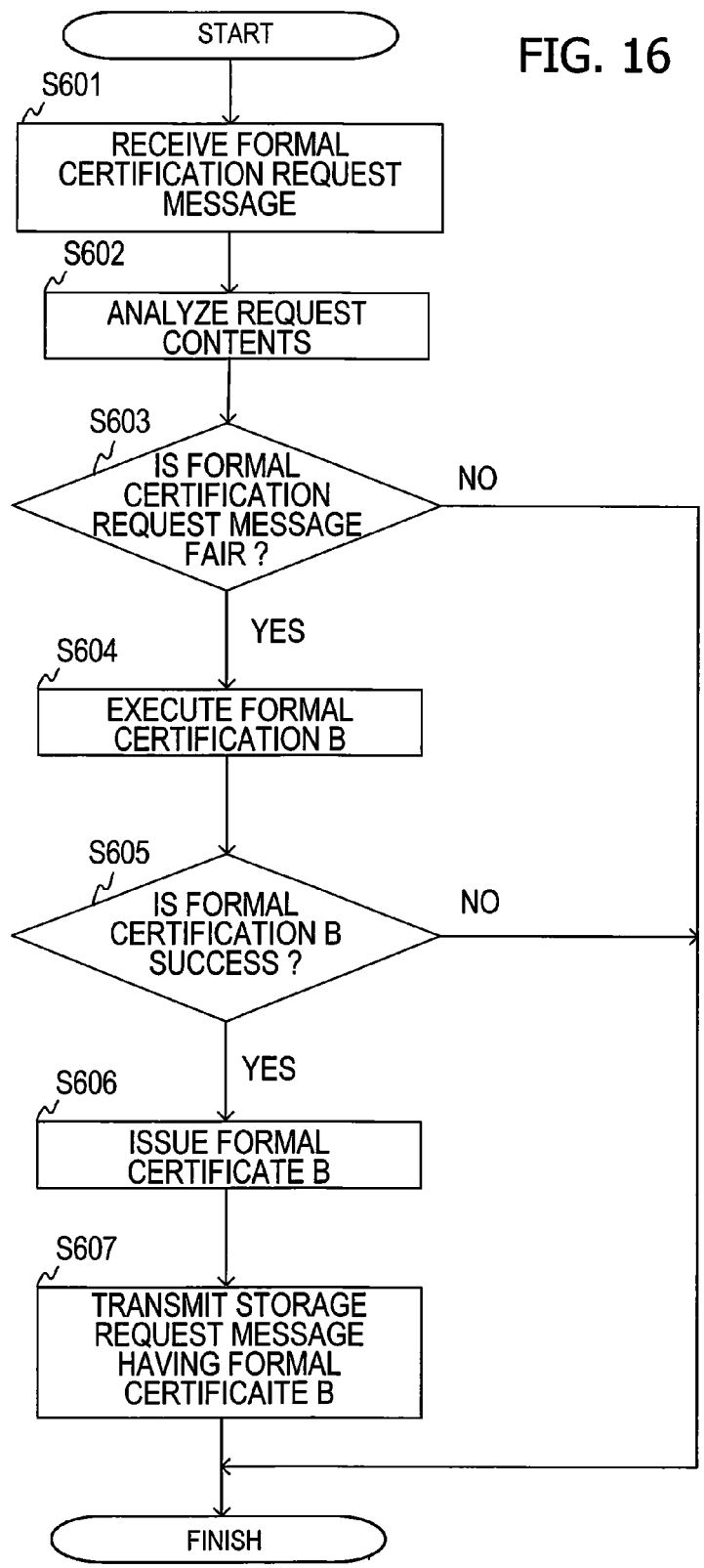
FIG. 16 is a flow diagram to explain an example of the flow of the process of which the formal certification server B60 in FIG. 8 carries out.

FIG. 16 is a flow diagram to explain an example of the flow of the process of which the formal certification server B60 in FIG. 8 carries out. With reference to FIG. 1, FIG. 2, FIG. 8 and FIG. 16, a flow of the process of which the formal certification server B60 in FIG. 8 carries out.

Step S601: The administration unit 631 in the formal certification server B60 receives the formal certification request message transmitted by the temporary certification server B50 and stores it in the memory 63. The administration unit 631 stores the formal certification request message with cue structure in the memory 63. The temporary certification server B50 transmits the formal certification request message by the execution of the step S507 in FIG. 15.

Step S602: The administration unit 631 analyzes the contents of the request from the formal certification request message. Because this message has the request ID, the certificated ID of the temporary certificate B and the electronic certificate for the formal certification B, the administration unit 431 analyzes that the contents of the request is the formal certification request, and moves to step S603.

Step S603: The administration unit 631 verifies the electronic-signature which is given to the formal certification request message and determines whether the formal certification request message is a fair or not. Here, when the formal certification request message is fair, it indicates that a third party does not forgery and falsify for the formal certification request message. When the formal certification request message is fair (step S603/YES), the process moves to step S604.

Step S604: The formal certificate issuance unit 632 carries out the formal certification B based on an electronic certificate (referring to the mark INF in FIG. 3) for the formal certification B in the certification information in which the certification request message has. The formal certificate issuance unit 632 carries out the formal certification based on the electronic certificate for the formal certification B and the formal certification information B which is stored in the storage device 64 and is indicated by the mark RCb. The formal certificate issuance unit 632 carries out, for example, the PKI certification as the formal certification.

In the case of the PKI certification, the formal certification information B includes an access information (for example, URL (Uniform Resource Locator) of the Certificate Authority) to the Certificate Authority which issued an electronic certificate for the formal certification B, for example. When performing the PKI certification as the formal certification B, the formal certificate issuance unit 632 performs the confirmation processing which was described in the step S404 in FIG. 14, sequentially, for example. When the formal certificate issuance unit 632 confirmed that the Certificate Authority is a fair, the electronic certificate does not lapse, the expiration date of the electronic certificate is valid, the formal certificate issuance unit 632 determines that the formal certificate B is success. Because the formal certificate issuance unit 632 performs the above confirmation processing sequentially, the processing time of the formal certification B becomes longer in comparison with the processing time of temporary certification which carries simple authenticating.

Step S605: The formal certificate issuance unit 632 determines whether the formal certification succeeded or failed. When the formal certification succeeds (S605/YES), the process moves to step S606.

Step S606: The formal certificate issuance unit 632 issues the formal certificate B. Specifically, the formal certificate issuance unit 632 decides that the temporary certificate ID of the temporary certificate B is the formal certificate ID of the formal certificate B, and decides that a target person of the formal certificate B is the user ID in the certification information of the formal certification request message which is received. The above user ID is the ID that a user input in step S11 of FIG. 11. In addition, a target person of the formal certificate B may be the user ID that an electronic certificate for the formal certification B has. Furthermore, the formal certificate issuance unit 632 determines that the contents of each item of the formal certificate B are the formal certificate ID, the issuer of the formal certificate A, the operation, the issue date and the electronic-signature of the issue organization. In the example of FIG. 8, the formal certificate issuance unit 632 decides the formal certificate ID with "00111" and decides a target person with "000ABC".

Here, the formal certificate issuance unit 632 stores and administrates the operation contents corresponding to the user ID beforehand. In the example of FIG. 8, the formal certificate issuance unit 632 stores the operation contents "read" corresponding to the user ID "000ABC". In this case, the formal certification information B may be included the operation contents corresponding to the user ID. That is, when the certification includes an admission for any process, the formal certification information may be included the operation contents corresponding to the user ID. The formal certificate B is referred to the mark RSb in FIG. 8 for more detail. In addition, the step S601-step S606 are equivalent to the step S9 in FIG. 2.

Step S607: The administration unit 631 creates a storing request message including the formal certificate B, and transmits it to the administration server 70. The step S607 is equivalent to the step S14 in FIG. 2.

In addition, when the formal certification request message is not fair (step S603/NO) and when the formal certification fails in the step S605 (step S605/NO), the processing in step S607 is omitted.

(Flow of the Processing that Administration Server Carries Out)

Figure 17:
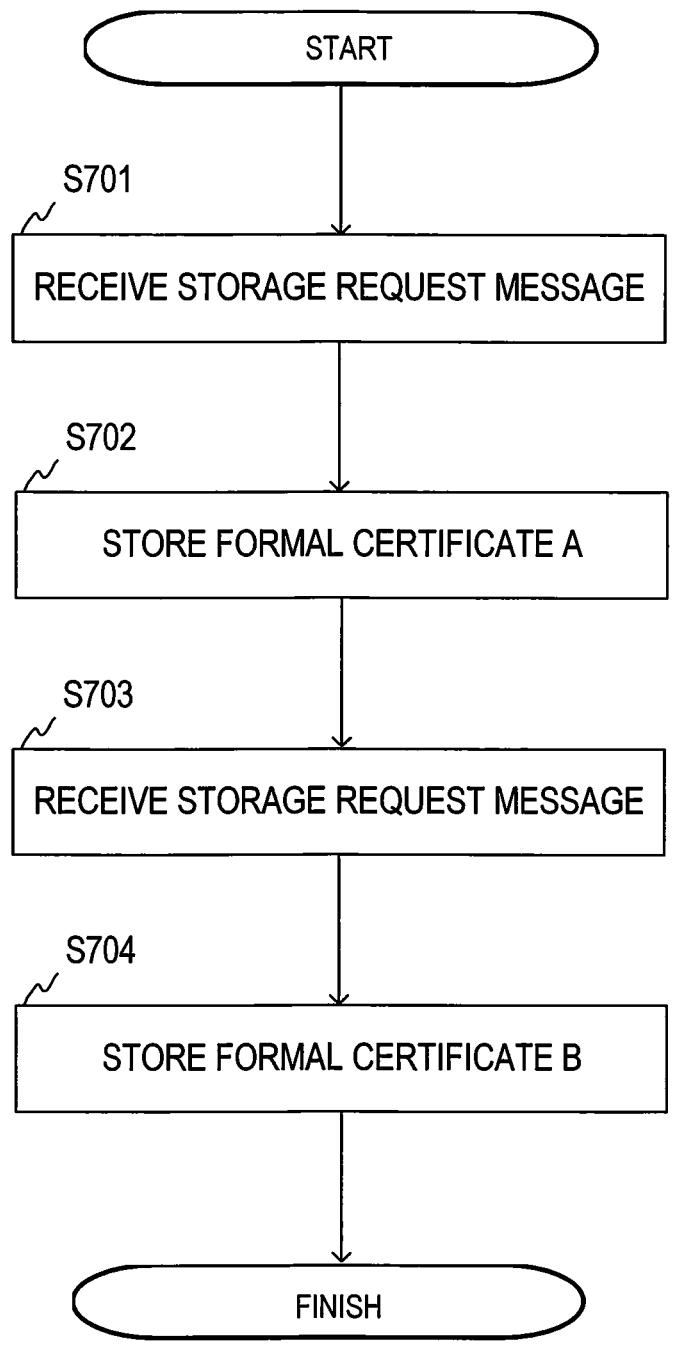
FIG. 17 is a first flow diagram and FIG. 18 is a second flow diagram to explain an example of the flow of the process of which administration server 70 in FIG. 9 carries out.
Figure 18:
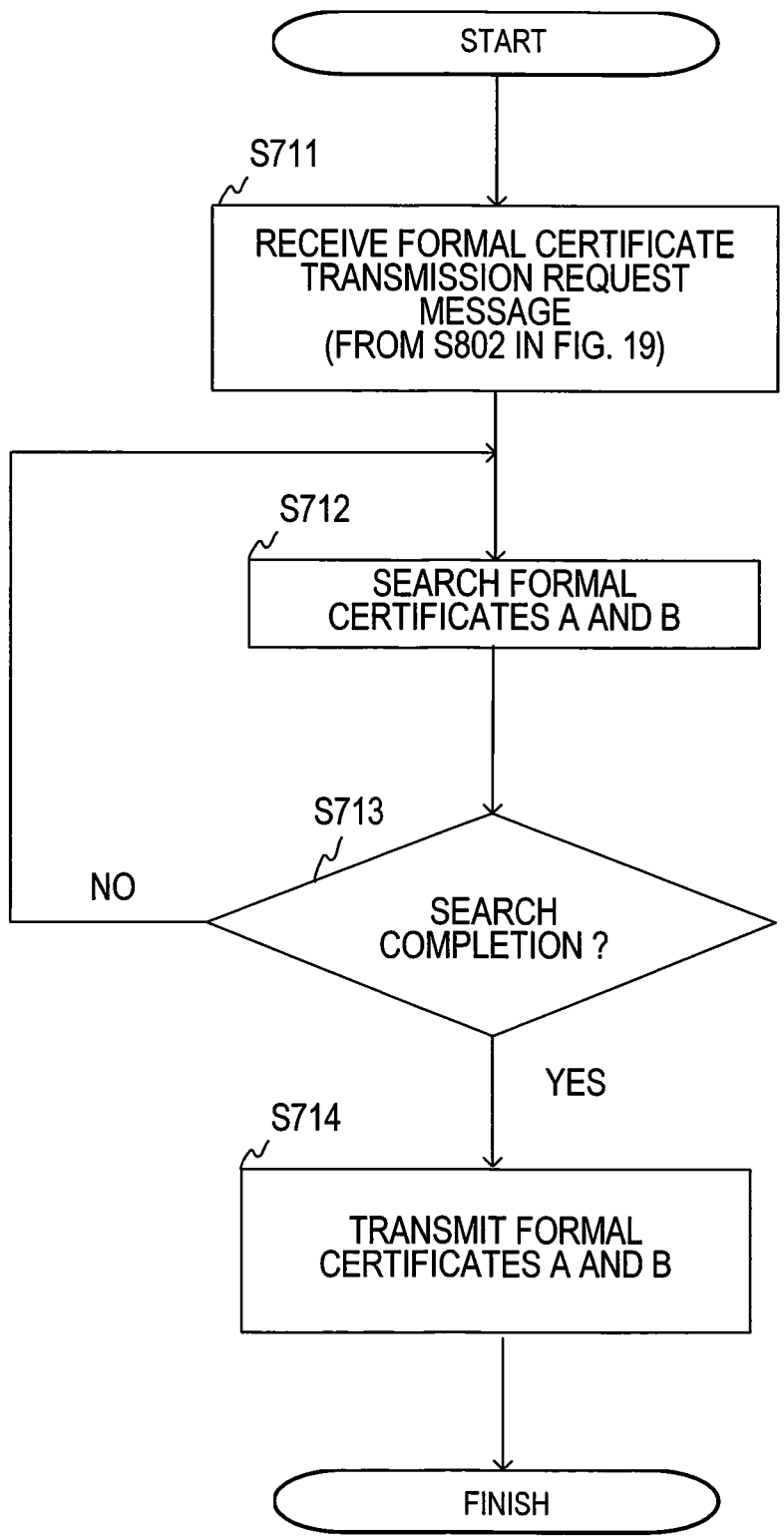

FIG. 17 is a first flow diagram and FIG. 18 is a second flow diagram to explain an example of the flow of the process of which administration server 70 in FIG. 9 carries out. With reference to FIG. 1, FIG. 2, FIG. 9, FIG. 17 and FIG. 18, a flow of the process of which the administration server 70 in FIG. 9 carries out.

Step S701: The administration unit 731 in the administration server 70 receives the storing request message including the formal certificate A transmitted from the formal certification server A40. The formal certification server A40 transmits the storing request message by the execution of the step S407 in FIG. 14.

Step S702: The administration unit 731 in the administration server 70 stores the formal certificate A in the storing request message which is received in step S701 into the storage device 74. In this time, the administration unit 731 stores the formal certificate A so as to correspond with the certificate ID of the formal certificate A. In FIG. 9, the certificate ID is referred to the mark IDa and the formal certificate A is referred to the mark RSa. In addition, the step S701 and step S702 are equivalent to the step S11 in FIG. 2.

Step S703: The administration unit 731 in the administration server 70 receives the storing request message including the formal certificate B transmitted from the formal certification server B60. The formal certification server B60 transmits the storing request message by the execution of the step S607 in FIG. 16.

Step S704: The administration unit 731 in the administration server 70 stores the formal certificate B in the storing request message which is received in step S703 into the storage device 74. In this time, the administration unit 731 stores the formal certificate B so as to correspond with the certificate ID of the formal certificate B. In FIG. 9, the certificate ID is referred to the mark IDb and the formal certificate B is referred to the mark RSb. In addition, the step S703 and step S704 are equivalent to the step S15 in FIG. 2.

In addition, the order of the step S701 and the step S703 may be replaced due to a first time from a processing start to the processing end of the formal certification A of which the formal certification server A40 carried out and a second time from a processing start to the processing end of the formal certification B of which the formal certification server B60 carried out. In other words, in FIG. 17, the order of step S703 may be replaced with step S701. Then, the explanation moves to FIG. 18.

Step S711: The administration unit 731 in the administration server 70 receives the formal certificate transmission request message transmitted from the reference server 80. The reference server 80 transmits the formal certificate transmission request message by the execution of step S802 in FIG. 19.

Step S712: The search unit 732 does the certificate ID of the formal certificate A and the certificate ID of the formal certificate B in the formal certificate transmission request message which is received in the step S711, as a key and searches the formal certificate A including the certificate ID of the formal certificate A and the formal certificate B including the certificate ID of the formal certificate B, from the storage device 74.

Step S713: The search unit 732 continues the process in step S712 until search of the formal certificate A and the formal certificate B is finished (step S713/NO). In the process to repeat of the step S712 and the step S713, the administration unit 731 may carry out the storing processing of the formal certificate A and the formal certificate B as described in FIG. 17 (referring to the step S702 and the step S704 in FIG. 17).

When search unit 732 finishes the search process of the formal certificate A and the formal certificate B (step S713/YES), the process moves to step S714.

Step S714: The administration unit 731 transmits the return message including the formal certificate A and the formal certificate B, of which the search unit 732 searched, to the reference server 80.

In addition, the search unit 732 regards a search failure and finishes the search, when the elapsed times from a start of the search processing to carry out by the step S712 exceed appointed time. When the search unit 732 finishes the search by the search failure, the administration unit 731 transmits the return message including information indicating the search failure to the reference server 80. One cause of the search failure is a case that the formal certificate issuance unit 432 in the formal certification server A40 does not issue the formal certificate A because the formal certification A failed (step S405/NO in FIG. 14). In addition, another cause is a case that the formal certificate issuance unit 632 in the formal certification server B60 does not issue the formal certificate B because the formal certification B failed (step S605/NO in FIG. 16). In addition, the step S711-step S714 are equivalent to the step S17 in FIG. 2.

(Flow of the Processing that Reference Server Carries Out)

Figure 19:
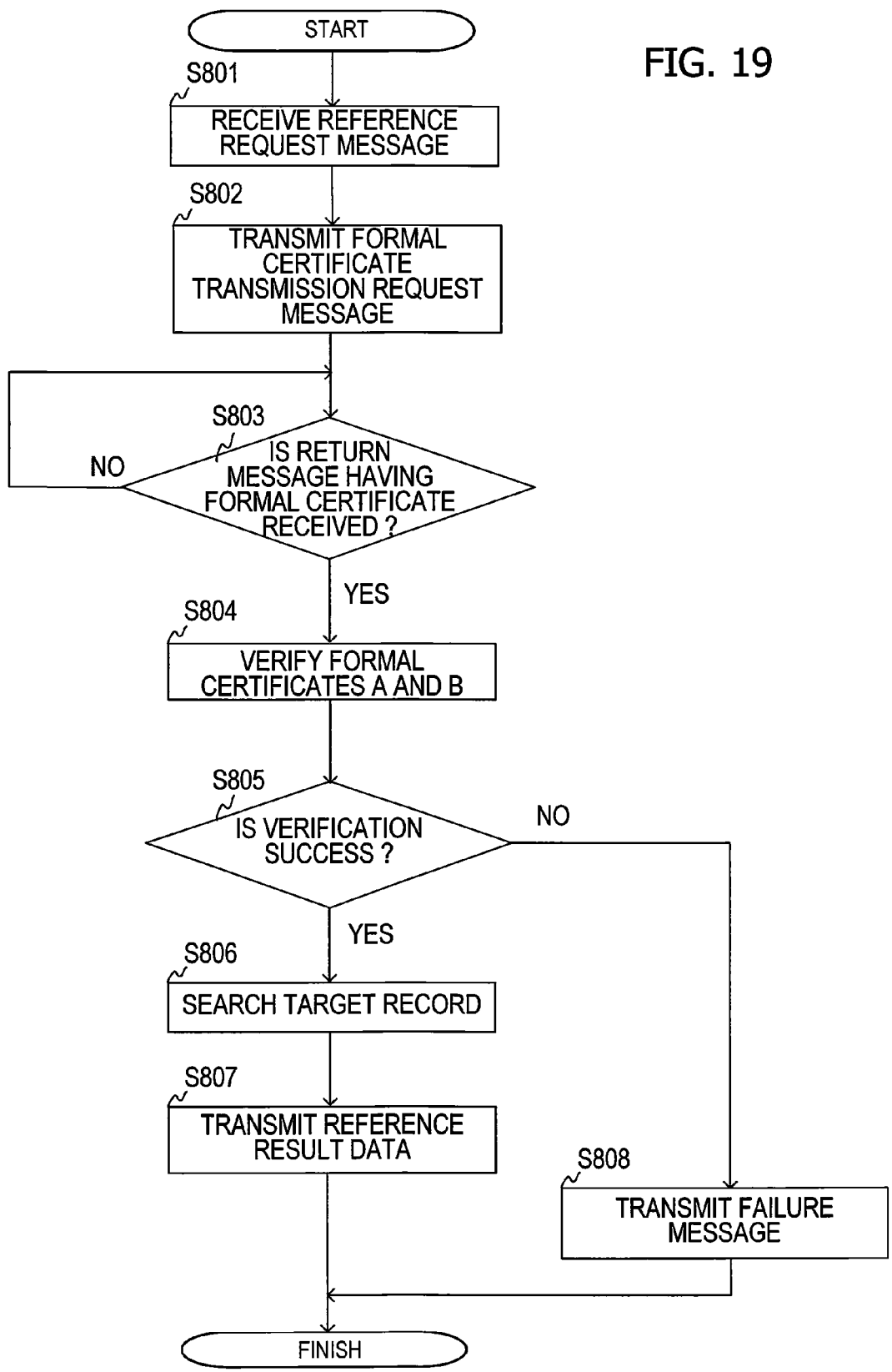
FIG. 19 is a flow diagram to explain an example of the flow of the process of which the reference server 80 in FIG. 10 carries out.

FIG. 19 is a flow diagram to explain an example of the flow of the process of which the reference server 80 in FIG. 10 carries out. With reference to FIG. 1, FIG. 2, FIG. 10 and FIG. 19, a flow of the process of which the reference server 80 in FIG. 10 carries out.

Step S801: The administration unit 831 in the reference server 80 receives the reference request message including the temporary certificate A and the temporary certificate B transmitted from the reference origin server 20 and stores it in the memory 83. The administration unit 831 stores this reference request message with cue structure in the memory 83. The reference origin server 20 transmits the reference request message by the execution of the step S205 in FIG. 12.

Step S802: The administration unit 831 creates the formal certificate transmission request message including the certificate ID of the formal certificate A and the certificate ID of the formal certificate B, and transmits it to the administration server 70. The certificate ID of the formal certificate A is the ID same as the certificate ID of the temporary certificate A in the reference request message which is received in step S801, and the certificate ID of the formal certificate B is the ID same as the certificate ID of the temporary certificate B in the reference request message. In this way, it is possible that the formal certificate corresponds with the temporary certificate by making the certificate ID of the temporary certificate and the certificate ID of the formal certificate to same ID.

Step S803: The administration unit 831 determines whether or not received the return message including the formal certificate A and the formal certificate B transmitted from the administration server 70. Here, the administration unit 831 is in condition to be waiting the reception of the return message. When the administration unit 831 does not receive the return message from the administration server 70 (step S803/NO), the administration unit 831 continues the process in the step S803. The administration server 70 already transmitted the return message by the execution of step S714 in FIG. 18. When the administration unit 831 receives the return message from the administration server 70 (step S803/YES), the process moves to step S804.

Step S804: The verification unit 832 carries out verification of the formal certificate A and the formal certificate B in the return message which is received. Specifically, the verification unit 832 verifies expiration date of the formal certificate A and the formal certificate B. For example, the verification unit 832 determines that the formal certificate A is within the expiration date, when the current date and time is within the scheduled date and time from an issue date of the formal certificate A. Similarly, the verification unit 832 determines that the formal certificate B is within the expiration date, when the current date and time is within the scheduled date and time from an issue date of the formal certificate B. For example, the above scheduled date and time are 30th. Besides, the verification unit 832 verifies the authority of operation contents when the contents of the certificate represent the authorization. For example, when an information processing request is the data reference request like the above example and the certification includes the authorization, the verification unit 832 determines that the authorization is valid when the operation of the formal certificate of the formal certification in this certification is "read" (reading possibility) or "write" (renewal possibility). In addition, when an information processing request is data change request, the verification unit 832 determines that the authorization is valid when the operation of the above formal certificate is "write" (renewal possibility). Besides, when an information processing request is data deletion request, the verification unit 832 determines that the authorization is valid when the operation of the above formal certificate is "delete" (delete possibility).

In addition, the verification unit 832 may confirm electronic-signature of the formal certificate A and electronic-signature of the formal certificate B and may determine that the formal certificate A and the formal certificate B are fair. Here, when the formal certificate is fair, it means that an electronic certificate is issued in an appropriate organization.

Step S805: The verification unit 832 determines whether the verification of the formal certificate succeeded. Here, a case when the verification of the formal certification is success is a case that all of the formal certificate A and the formal certificate B are within the expiration date and the authorization is fair, in example of the step S804. When the verification of the formal certificate succeeds (step S805/YES), the process moves to the step S806. Here, the verification date and time of the formal certificate is "2012/4/1", and above scheduled date and time is 30th. The issue date of the formal certificate A and the formal certificate B is "2012/4/1" as having illustrated by FIG. 6 and FIG. 8. Therefore, the verification unit 832 determines that the formal certificate A and the formal certificate B are within the expiration date. In addition, an information processing request is data reference request like the above example. Furthermore, the operation of the formal certificate B of the formal certification B in the second certification is "read" as having illustrated by FIG. 8. Therefore, the verification unit 832 determines that the authorization is fair. In this way, in the example of FIG. 6 and FIG. 8, the verification unit 832 determines that the verification of the formal certificate is success.

Step S806: The search unit 833 does a target person of the formal certificate A or the formal certificate B as a key and searches the record of the target person among the business data DT. The target person of the formal certificate A and the target person of the formal certificate B are all "000ABC". The search unit 833 searches one record which is stored the tax payment information of the target person "000ABC" from the business data which is explained in FIG. 10. The search unit 833 searches a record having "000123" as the record ID, "000ABC" as a tax payer ID, "XYZ" as a full name, "XX prefecture YY city ZZ address" as an address of the tax payer, and "M Japanese yen" as the amount of tax payment, in the example of FIG. 10. In addition, the step S801-step S806 are equivalent to the step S16 in FIG. 2.

Step S807: The administration unit 833 creates the reference result data having the tax payment record of which the search unit 833 searched, and transmits it to the reference origin server 20. In addition, the step S807 is equivalent to the step S18 in FIG. 2.

In addition, in the step S805, when the verification is failure (step S805/NO), the process moves to step S808. Or, in the step S803, when the judgment state which does not receive the return message including both certificates of the formal certificate A and the formal certificate B continues for a predetermined time (for example, ten minutes), the process moves to step S808. In other words, when an elapsed time after the administration unit 831 transmits the certificate transmission request message is more than the predetermined time, the process moves to step S808.

Step S808: The administration unit 831 transmits the return message including information indicating the verification failure to the reference origin server 20. When the Web application 231 in the reference origin server 20 receives the return message through the reference request unit 232, the Web application 231 notifies the message that the reference request failed to the user terminal 10. When the administration unit 151 in the user terminal 10 receives the above notice, the administration unit 151 displays the message that the reference request failed to the display device 121.

By executing the step S807, the step S206 (YES), the step S207 in FIG. 12, and the step S103 (YES) in FIG. 11 are carried out, and the administration unit 151 in the user terminal 10 in FIG. 3 displays the reference result data having the tax payment record to the display device 121 (step S104 in FIG. 11). In other words, it is possible that the user read the tax payment data which the user inquires, by the execution of the processing which are explained in FIG. 11-FIG. 18.

Figure 20:
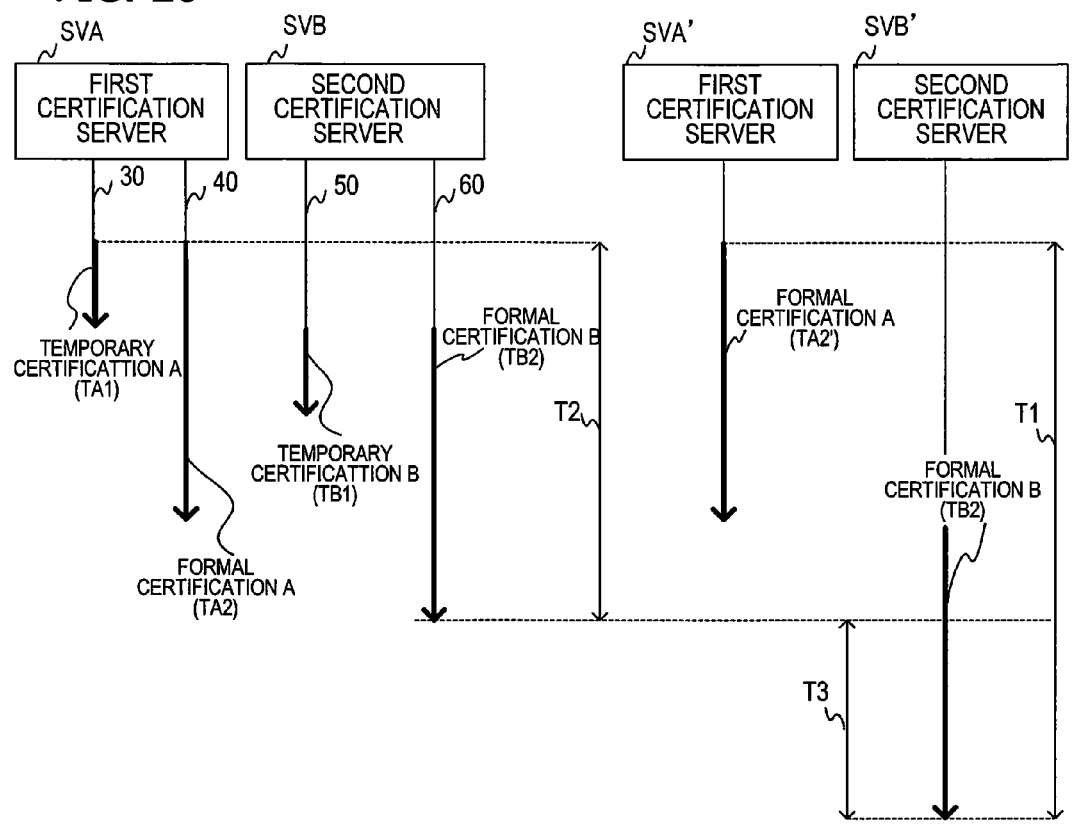
FIG. 20 is a diagram which compares the total time for certification processing according to the embodiment and the total time when the certification process of the embodiment is not carried out.

FIG. 20 is a diagram which compares the total time for certification processing according to the embodiment and the total time when the certification process of the embodiment is not carried out. In FIG. 20, the arrow indicated by a mark TA1 represents the processing time of the temporary certification A of which the temporary certificate issuance unit 332 in the temporary certification server A30 carries out, and the arrow indicated by a mark TA2 represents the processing time of the formal certification A of which the formal certificate issuance unit 432 in the formal certification server A40 carries out. In addition, in FIG. 20, the arrow indicated by a mark TB1 represents the processing time of the temporary certification B of which the temporary certificate issuance unit 532 in the temporary certification server B50 carries out, and the arrow indicated by a mark TB2 represents the processing time of the formal certification B of which the formal certificate issuance unit 632 in the formal certification server B60 carries out. Further, the length of the arrow indicated by the mark TA1 and the mark TB1 are exaggerated for illustration. In other words, the processing times of temporary certification A and the temporary certification B are shorter enough than the processing times of the formal certification A and the formal certification B.

The first certification server SVA' carries out the first certification, that is the formal certification A, and the second certification server SVB' carries out the second certification, that is, the formal certification B when the first certification succeeds. In other words, the first certification server SVA' and the second certification server SVB' are certification servers which do not carry out the certification process of the embodiment. In this way, when the certification process of the embodiment is not carried out, a time from a start of the formal certification A and the formal certification B to the end of both formal certifications A and B, is a time indicated by an arrow of mark T1.

On the other hand, as illustrated in FIG. 2, in the embodiment, the first certification server SVA carries out the formal certification A in a background during the execution of the temporary certification A. And the second certification server SVB supposes that the formal certification A succeeded when the temporary certification A succeeds, and carries out the temporary certification B and carries out the formal certification B in a background during the execution of the temporary certification B. Therefore, the processing time of the formal certification A (referring to mark TA2) overlaps with the processing time of the formal certification B (referring to mark TB2). As a result, the processing times of the formal certification A and the formal certification B become times indicated by the mark T2. And the time indicated by this mark T2 is shorter than the time indicated by the mark T1 for time indicated by a mark T3.

In other words, the total time for certification processing in the embodiment (referring to the mark T2) shortens in comparison with the total time for certification processing when the certification process of the embodiment is not carried out (referring to the mark T1). As a result, it is possible to shorten time until acquiring reference result data after the user inquires the request.

In addition, in the embodiment, the information processing service providing system ITS transmits the temporary certificate, which is issued by the temporary certification that the processing time has a shorter enough than the formal certification, to the user system US. Therefore, it is possible that the user system US requires the execution of the next certification processing based on the temporary certificate to the information processing service providing system ITS. As a result, it is possible that the user system US shorten waiting time for the next certification request and the next inquiring request.

Specially, even if a large number of certification requests arrive at the information processing service providing system ITS at the same time, and access concentrates on the first certification server SVA and the second certification server SVB, it is possible that the first certification server SVA and the second certification server SVB carry out the simple temporary certification and issue the temporary certificates. Because this simple temporary certification has few processing processes, it is possible that the first certification server SVA and the second certification server SVB issue the temporary certificates quickly. Therefore it is possible that the user system US shorten waiting time for the next certification request and the next inquiring request.

In addition, according to the embodiment, when the temporary certification in the first certification server SVA is finished, the second certification server SVB, in response to the reception of the certification request including the temporary certificate A, carries out the temporary certification B and carries out the formal certification B. In other words, the temporary certification B and the formal certification B cooperates with the temporary certification A and three certifications are carried out sequentially. By this cooperation, it is possible that the second certification server SVB carries out the temporary certification B and the formal certification B immediately.

In addition, according to the embodiment, formats of the temporary certificate A, the formal certificate A, the temporary certificate B, and the formal certificate B which are explained in FIG. 5-FIG. 8 are common each. Therefore it is possible that the processing at the time of the certificate issuance in the temporary certificate issuance unit 332 in the temporary certification server A30, the formal certificate issuance unit 432 in the certification server A40, the temporary certificate issuance unit 532 in the temporary certification server B50, and the formal certificate issuance unit 632 in the certification server B60, are common for the most part.

Second Embodiment

In the second embodiment, the processing to recycle the certificate will be explained. By carrying out the processing which is explained in FIG. 2, a user requests the execution of the information processing service to the information processing service providing system ITS, and receives the offer of this information processing service from the information processing service providing system ITS. Then the user again requires the execution of the same information processing service.

In the explanation according to the first embodiment, the information processing service was reference of the tax payment record. In the reference of the tax payment record, the administration server 70 has already stored the formal certificate A and the formal certificate B in the storage device 74 (referring to the step S11 and the step S15 in FIG. 2). Furthermore, the administration unit 151 in the user terminal 10 stores the temporary certificate A and the temporary certificate B transmitted from the reference origin server 20 in the storage device 16 as illustrated by FIG. 12 (referring to the marks TSa and TSb in FIG. 3). Here, when the reference server 80 receives an information processing request (for example, an reference request message) including the temporary certificate A and the temporary certificate B, which were transmitted from the user terminal 10, after transmitted the execution result (referring to the step S801 in FIG. 19), the reference server 80, in response to this information processing request, carries out processing as described the step S802 and later in FIG. 19.

Figure 21:
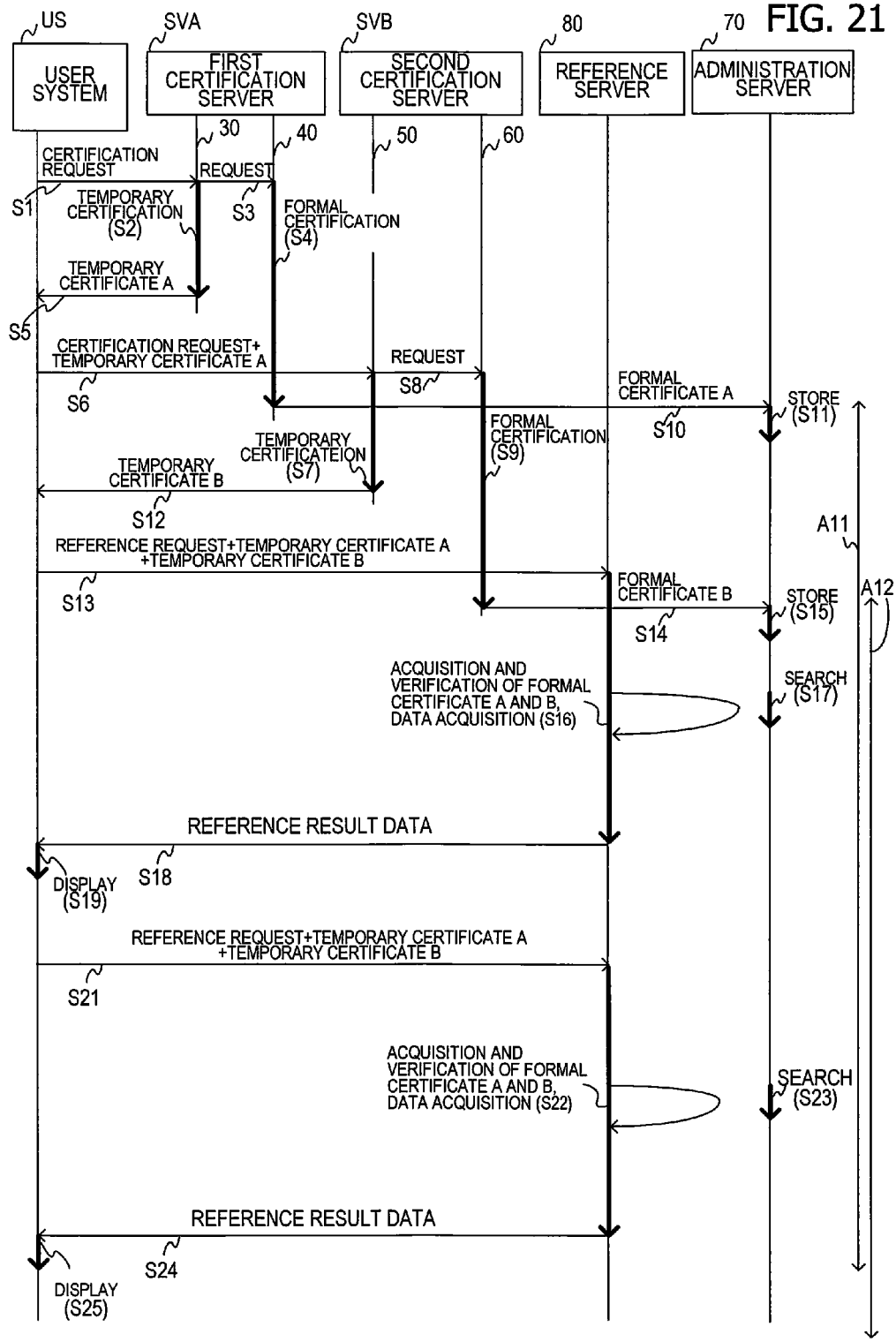
FIG. 21 is a diagram explaining a flow of the processing to recycle the formal certificate.

FIG. 21 is a diagram explaining a flow of the processing to recycle the formal certificate. FIG. 21 is a diagram continuing after FIG. 2. That is, the step S1—the step S19 in FIG. 21 are processing same as the step S1—the step S19 in FIG. 1. Therefore, the explanations of the step S1—the step S19 in FIG. 21 are omitted. The arrow indicated by a mark A11 schematically represents the expiration date of the formal certificate A, and the arrow indicated by a mark A12 schematically represents the expiration date of the formal certificate B.

Step S21: The administration unit 151 in the user terminal 10 transmits the temporary certificate A and the temporary certificate B in which the storage device 16 stores to the reference server 80 with the reference request. Specifically, the administration 151 carries out the following processing when the storage device 16 stores the temporary certificate A and the temporary certificate B in a state displaying a reference request screen to the display device 121 (referring to the step S101 in FIG. 11). In other words, the administration unit 151 displays the button indicating a reference request by the recycling of the certificate from a user to a reference request screen more. When a user operates the operation device 131 and operates this button, the administration unit 151, in response to the above operation, creates a reference request message including the temporary certificate A and the temporary certificate B, and transmits it to the reference origin server 20. The reference request unit 232 in the reference origin server 20 receives the reference request message including the temporary certificate A and the temporary certificate B through the Web application 231 and transmits the reference request message which is received to the reference server 80.

Because the process in the step S22—the step S25 after the step S21 are processing same as the step S16—the step S19 in FIG. 2, the explanation are omitted. In addition, in the execution of the step S22, it is assumed that the verification of the formal certificate A and the verification of the formal certificate B (the step S803 in FIG. 19) are success (S805/YES in FIG. 19).

It is possible that the user read the tax payment data which the user inquires and required as illustrated by the first embodiment, by the execution of the step S25. As described in FIG. 21, in a reference request after the second time, it is possible to omit the first certification and the second certification by recycling the already issued certificate. As a result, the certification process of the first certification server SVA and the second certification server SVB becomes needless, and processing load disappears. Therefore, it is possible to save a hardware resource. Furthermore, it is possible that the user obtain a reference result quickly, because waiting time of the certification processing reduces.

By the way, in the execution of the process in FIG. 21, it is assumed that the verification of the formal certificate A, or the verification of the formal certificate B, or both of the verification of the formal certificate A and the verification of the formal certificate B are failed (step S805/NO in FIG. 19). For example, as a cause of the failure of the verifications, there were a case that expiration date of the formal certificate A was expired and a case that expiration date of the formal certificate B has been expired. Then processing when such the verifications failed will be explained.

Figure 22:
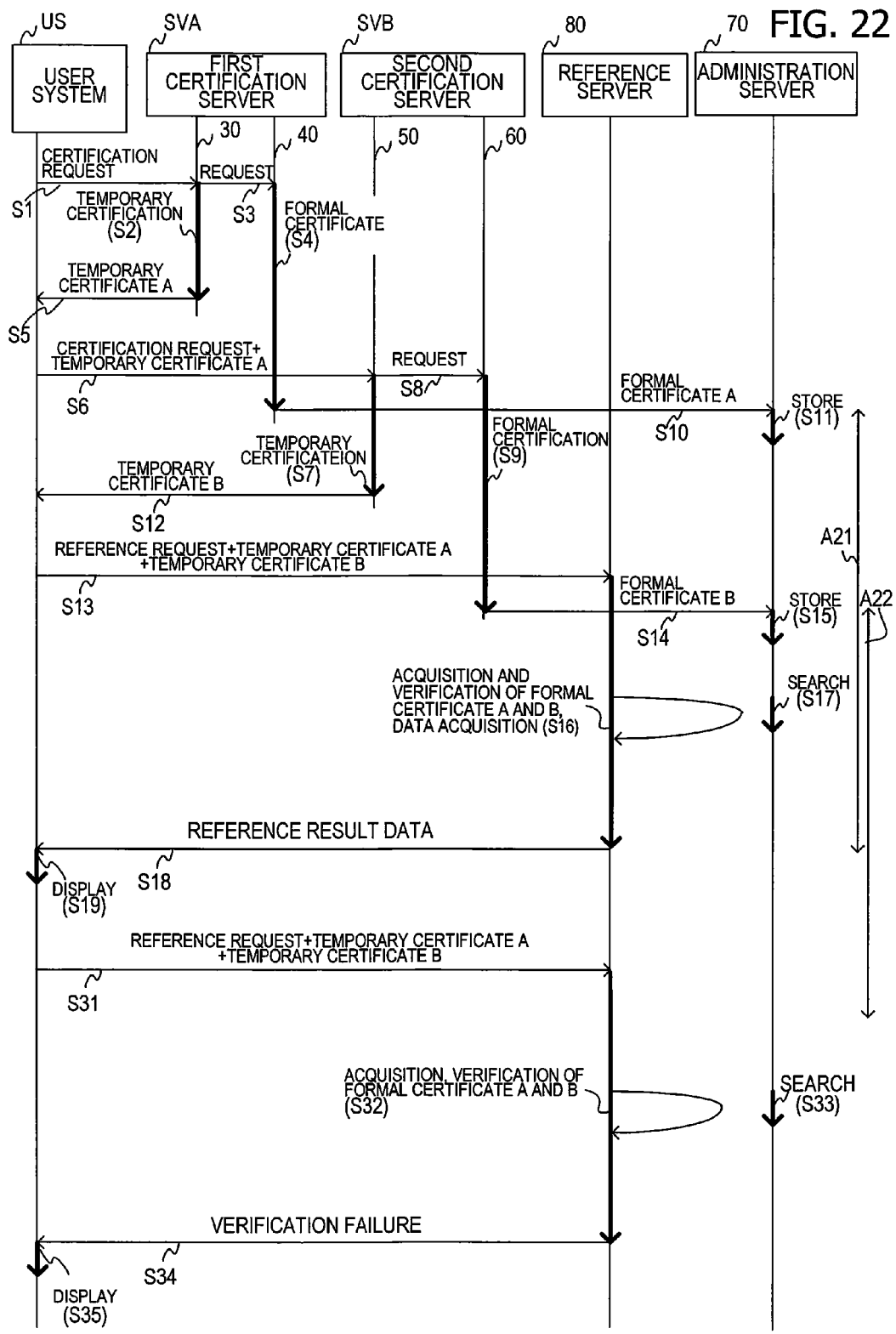
FIG. 22 is a diagram explaining a flow of the processing when the verification of the formal certificate failed in the recycling of the formal certificate which is explained in FIG. 21.

FIG. 22 is a diagram explaining a flow of the processing when the verification of the formal certificate failed in the recycling of the formal certificate which is explained in FIG. 21. FIG. 22 is a diagram continuing after FIG. 2. Therefore, the step S1—the step S19 in FIG. 22 is processing same as the step S1—the step S19 in FIG. 1. Therefore, the explanations of the step S1—the step S19 in FIG. 22 are omitted. The arrow indicated by a mark A21 schematically represents the expiration date of the formal certificate A, and the arrow indicated by a mark A22 schematically represents the expiration date of the formal certificate B.

Step S31: The administration unit 151 in the user terminal 10 transmits the temporary certificate A and the temporary certificate B in which the storage device 16 stores to the reference server 80 with the reference request. Because the process in the step S31 is a process of same as the step S21 in FIG. 21, the explanation are omitted. In the execution of this step S31, the expiration date of the formal certificate A and the expiration date of this certificate B have already expired on (referring to the arrows A21 and A22 in FIG. 22).

Step S32: The administration unit 831 in the reference server 80 requests a transmission of the formal certificate A and the formal certificate B to the administration server 70, in response to the reference request and acquires the formal certificate A and the formal certificate B from the administration server 70. The verification unit 832 carries out the verification of the formal certificate A and the formal certificate B which are acquired. However, because the expiration date of the formal certificate A and the expiration date of the formal certificate B have been expired, the verification unit 832 in the reference server 80 determines that the verification of the formal certificate A and the verification of the formal certificate B have failed (step S805/NO in FIG. 19). In addition, because the process in the step S33 is a same process as step S17 in FIG. 2, the explanation is omitted.

Step S34: The administration 831 transmits the return message including information indicating the verification failure (also called as the failure message) to the reference origin server 20 (referring to the step S808 in FIG. 19). Then the administration unit 831 may include the information indicating the reason that a reference request failed (for example, expiration on the expiration date of the formal certificate), in the return message.

When the Web application 231 in the reference origin server 20 receives the return message through the reference request unit 232, the Web application 231 notifies the user terminal 10 of a reference request having failed. In this time, when the return message has the information indicating the reason that a reference request failed, this information is also notified.

Step S35: When the administration unit 151 in the user terminal 10 receives the above notice, the administration unit 151 displays notice contents to the display device 121. This notice contents are an reference request having failed, and the causes that an reference request failed in more.

As described in FIG. 22, when the verification of the formal certificate fails for some kind of reasons, the security is maintained by not executing the reference request. In addition, the user terminal 10 displays an reference request having failed and the reason that a reference request failed to the user. Therefore, it is possible that the user acknowledges the reference request failed and the reason that the reference request having failed. As a result, it is possible that the user execute the second reference request that is considered this reason. In the case of the above example, the user acknowledges to request the certification and inquire from the beginning.

Third Embodiment

In the third embodiment, the processing when the first formal certification (the formal certification A) succeeded, but the second formal certification (the formal certification B) failed, will be explained. In this way, because the formal certificate A of the formal certification A has already issued, when the formal certification B fails, the formal certification A is omitted afterward and the processing of the temporary certification B and the formal certification B are carried out. In other words, when the temporary certification server B50 receives the temporary certificate A transmitted again from the user terminal 10, the temporary certification server B50 carries out the temporary certification B based on the temporary certificate A which is received and issues the temporary certificate B. Then the temporary certification server B50 transmits it to the user terminal 10 and requests the execution of the formal certification B.

Figure 23:
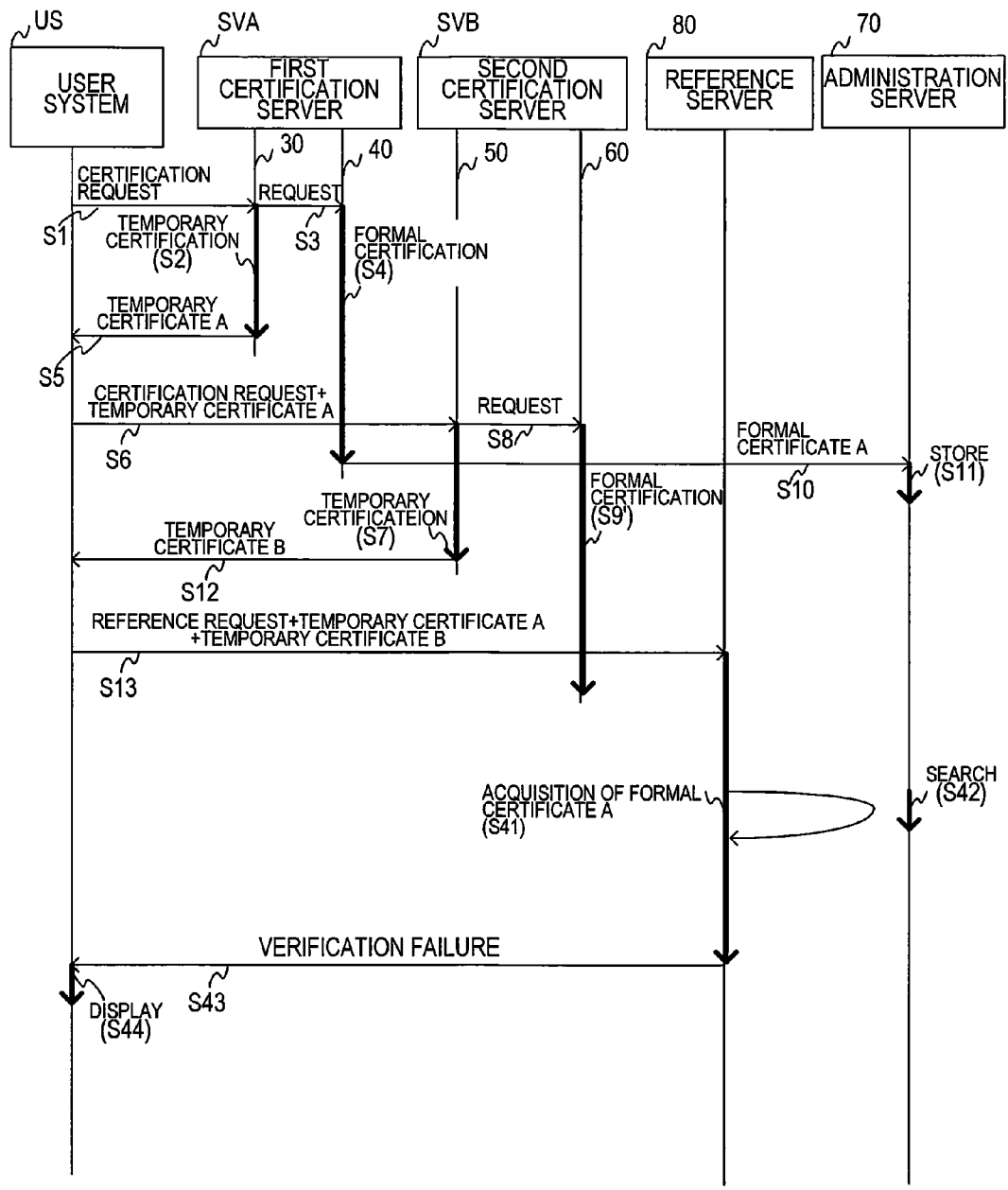
FIG. 23 is a first diagram explaining processing when the second formal certification (formal certification B) failed after the first formal certification (formal certification A) succeeded.

FIG. 23 is a first diagram explaining processing when the second formal certification (formal certification B) failed after the first formal certification (formal certification A) succeeded. In FIG. 23, the step S1-step S8 and the step S11-step S13 is processing same as processing of the step S1—the step S8, and the step S11—the step S13 in FIG. 2.

By the way, the formal certificate issuance unit 632 in the formal certification server B60 executes the formal certification B depicted by the step S9' (referring to the step S604 in FIG. 16), and the formal certification B failed in this execution (referring to the step S605/NO in FIG. 16). Because the formal certificate issuance unit 632 does not issue the formal certificate B when the formal certification B fails, the administration server 70 does not carry out the storing processing of the formal certificate B. In other words, the steps S14 and S15 in FIG. 2 are not executed. In addition, when the formal certification request message which is explained in the step S603 in FIG. 16 is not fair, the formal certificate issuance unit 632 does not issue the formal certificate B either, therefore the administration server 70 does not carry out the storing processing of the formal certificate B.

Here, the process moves to the execution of step S13, and the reference server 80 carries out the process of step S41.

Step S41: The administration unit 831 in the reference server 80 requests a transmission of the formal certificate A and the formal certificate B to the administration server 70 in response to the reference request and acquires only the formal certificate A from the administration server 70. Here, the administration server 70 searches the formal certificate A and the formal certificate B, in response to a transmission request of the formal certificate A and the formal certificate B from the reference server 80 (step S42). However, as described in the step S9, the reference server 80 does not store the formal certificate B. Therefore, as explained after explanation of the process in FIG. 18, the search unit 732 in the administration server 70 finishes the search without searching the formal certificate B (search failure). And the administration unit 731 transmits the return message including the formal certificate A and information indicating the search failure to the reference server 80.

Because it is not possible to acquire the formal certificate B, the verification unit 832 in the reference server 80 determines that the verification of the formal certificate B is failure (referring to the step S805/NO in FIG. 19).

Step S43: The administration unit 831 in the reference server 80 transmits the return message including information indicating the verification failure (also called as the failure message) to the reference origin server 20 (referring to the step S808 in FIG. 19). In this time, the administration unit 831 includes the information indicating the reason that a reference request failed (for example, failure of the formal certification B) in the return message. When the Web application 231 in the reference origin server 20 receives the return message through the reference request unit 232, the Web application 231 notifies the user terminal 10 of a reference request having failed. When the return message has the information indicating the reason that a reference request failed, this information is also notified.

Step S44: When the administration unit 151 in the user terminal 10 receives the above notice, the administration unit 151 displays notice contents to the display device 121.

By the way, the user reads the displayed notice and determines that the reference request has failed by causing of failure of the formal certification B. And the user carries out a reference request.

Figure 24:
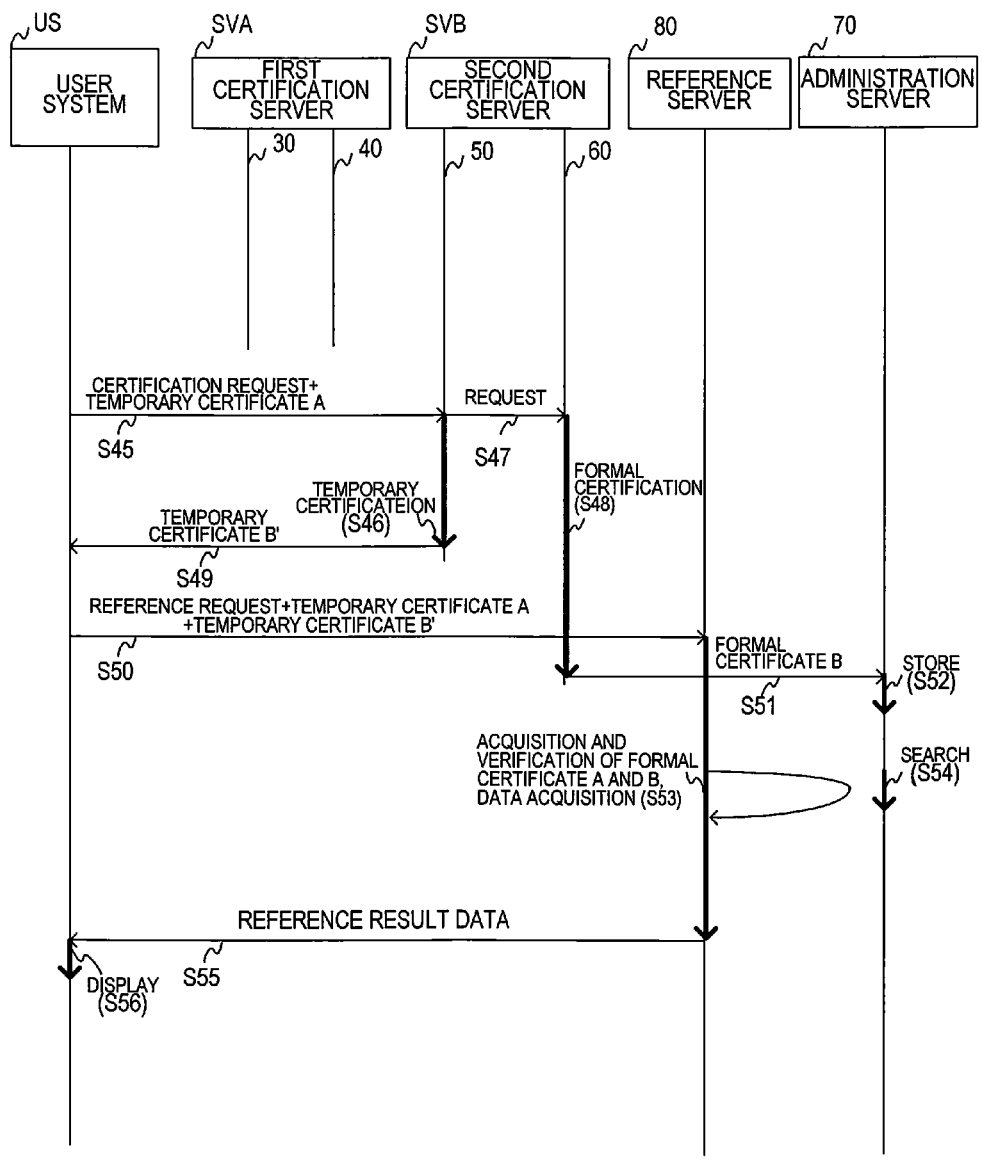
FIG. 24 is a second diagram explaining processing when the second formal certification (formal certification B) failed after the first formal certification (formal certification A) succeeded.

FIG. 24 is a second diagram explaining processing when the second formal certification (formal certification B) failed after the first formal certification (formal certification A) succeeded. FIG. 24 illustrates continuing process of the step S44 in FIG. 23. In addition, by the end process in FIG. 23, the storage device 16 in the user terminal 10 stores the temporary certificate A as illustrated by FIG. 12 (referring to the mark TSa).

Step S45: The administration unit 151 in the user terminal 10 transmits the temporary certificate A in which the storage device 16 stores to the temporary certification server B50 with the certification request. Specifically, the administration unit 151 carries out the following processing when the storage device 16 stores only the temporary certificate A in a state displaying a reference request screen to the display device 121 (referring to the step S101 in FIG. 11). In other words, the administration unit 151 displays the button indicating that the processing of the temporary certification B and the formal certification B in the second certification is possible even when the first certification is omitted, to the reference request screen more.

When a user operates the operation device 131 and operates this button, the administration unit 151, in response to the above operation, creates a certification request message including the temporary certificate A and the certification information, and transmits it to the reference origin server 20 in FIG. 4. The administration unit 151 includes the second certification information and input user ID and password in the above certification information. The reference origin server 20 receives the certification request message, and the reference request unit 232 transmits the certification request message which is received to the temporary certification server B50.

Step S46: The temporary certificate issuance unit 532 in the temporary certification server B50 executes the temporary certification in response to the certification request. The temporary certification is the simple certification based on the temporary certificate A. The temporary certificate issuance unit 532 in the temporary certification server B50 issues the temporary certificate B' of the temporary certification B after execution of the temporary certification B. In addition, the process of the step S46 is a process of like the step S7 in FIG. 2.

Step S47: The administration unit 531 in the temporary certification server B50 requests the formal certification to the formal certification server B60 in response to the certification request. In addition, the process in the step S47 is a process of like the step S8 in FIG. 2.

Step S48: The formal certificate issuance unit 632 in the formal certification server B60 carries out the formal certification B in response to the certification request. In addition, the process in the step S48 is a process of like step S9 in FIG. 2.

Step S49: The administration unit 531 in the temporary certification server B50 transmits the temporary certificate B' of which the temporary certificate issuance unit 532 issued to the reference origin server 20. In addition, the process of step S49 is a process of like step S12 in FIG. 2.

Step S50: The reference request unit 232 in the reference origin server 20 receives the temporary certificate B' and transmits the temporary certificate A (referring to the step S202 in FIG. 12) and the temporary certificate B' which have been received to the reference server 80, with the reference request. In addition, the process of step S50 is a process of like step S13 in FIG. 2.

The process of the step S51 which is the next step of the step S50-step S56 is processing same as processing of the step S14—the step S19 in FIG. 1 as follows. Therefore, the explanations are omitted.

As described in FIG. 23 and FIG. 24, when the second certification fails, it is possible to proceed the certification from the second certification using a certification result of the first certification performed in a preceding paragraph of the second certification. Therefore it is possible to omit the first certification. As a result, certification process of the first certification server SVA becomes needless, and processing load reduces, therefore it is possible to save a hardware resource. Furthermore, it is possible that the user obtains a reference result quickly because waiting time of the certification processing shortens.

Fourth Embodiment

In the fourth embodiment, cancellation process of the certification (also called as cancellation processing) will be explained. The user who requested a reference may cancel a reference request for some reason. One reason is when the user judges that it is not necessary to execute a reference request at present.

In a case of carrying out this cancellation of this reference request, when certification processing is carried out at the time of carrying out the cancellation, the formal certificate is not issued if cancelling the certification processing. Therefore, following inquire processing is not carried out. In the following description, the formal certification A and the temporary certification B are already finished, and the formal certification B is carrying out.

Figure 25:
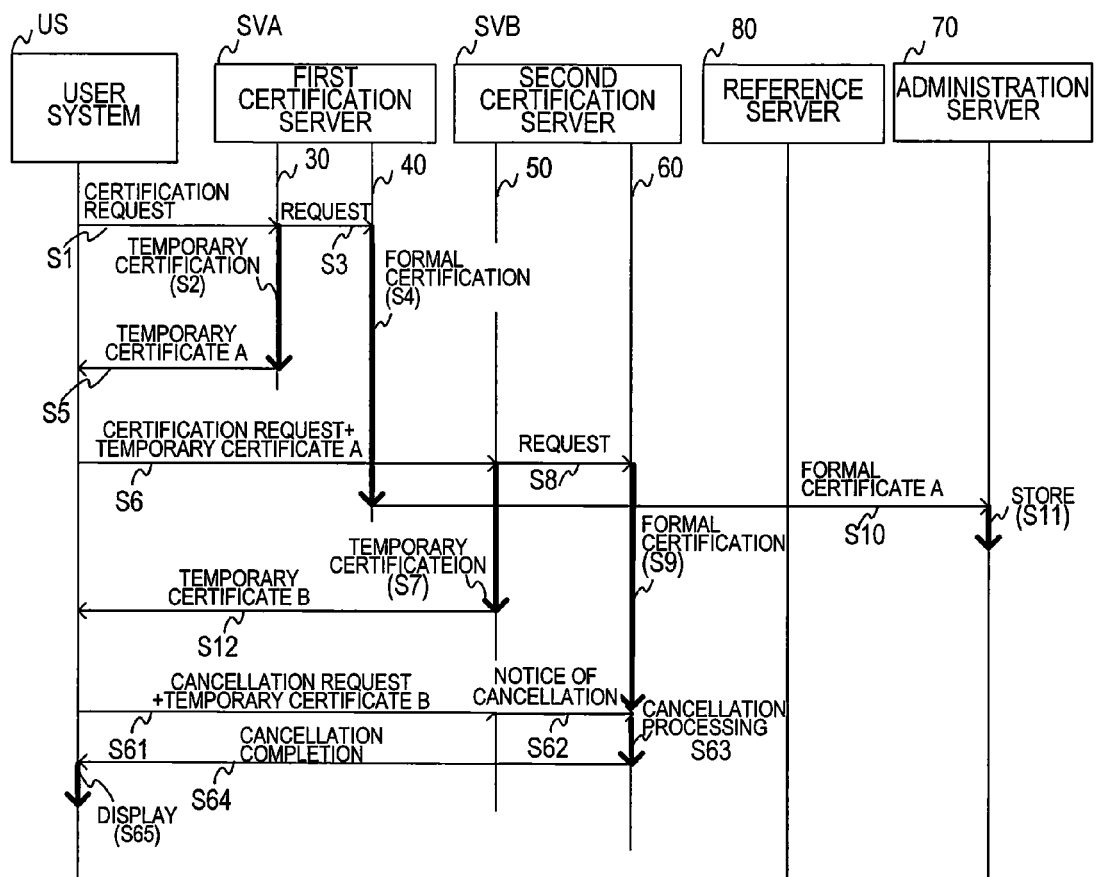
FIG. 25 is a diagram to explain about a cancel request of the certification processing.

FIG. 25 is a diagram to explain about a cancel request of the certification processing. The step S1—the step S12 in FIG. 25 is a process of same as the step S1—the step S12 in FIG. 2. In the end of the process in the step S12, the reference request unit 232 in the reference origin server 20 transmits the temporary certificate A and the temporary certificate B which are received to the user terminal 10 through the Web application 231. And the administration unit 151 in the user terminal 10 stores the temporary certificate A and the temporary certificate B which are received into the storage device 16 (referring to marks TSa and TSb in FIG. 3). In this way, when the temporary certificate A and the temporary certificate B are issued, it is a high possibility that the formal certification A is finished and the formal certification B is carried out or the formal certification B is finished. Therefore the user judges that the formal certification B is carrying out and requests a certification cancellation of the formal certification B to the second certification server SVB.

Step S61: The administration unit 151 in the user terminal 10 in FIG. 3 transmits the temporary certificate B in which the storage device 16 stores to the temporary certification server B50 with a certification cancellation request. Specifically, the administration unit 151 carries out the following processing when the storage device 16 stores the temporary certificate A and the temporary certificate B in a state displaying a reference request screen to the display device 121 (referring to the step S101 in FIG. 11). In other words, the administration unit 151 displays the button indicating that a certification cancellation request is possible, to the reference request screen more. When the user operates operation device 131 and operates this button, the administration unit 151, in response to the above operation, creates the cancellation request message including the temporary certificate B and transmits it to the reference origin server 20 in FIG. 4. The reference origin server 20 receives the cancellation request message including the temporary certificate B, and the reference request unit 232 transmits the cancellation request message which is received to the temporary certification server B50.

Step S62: When the administration unit 531 in the temporary certification server B50 receives the cancellation request message, the administration unit 531 transmits the cancellation request message to the administration unit 631 in the formal certification server B60 as a notice of cancellation.

Step S63: The formal certificate issuance unit 632 in the formal certification server B60 carries out the cancellation process of the formal certification B. Specifically, the administration unit 631 transmits a notice of cancellation which is received to the formal certificate issuance unit 632. The formal certificate issuance unit 632 administrates the process of the formal certification B in a correspondence with the temporary certificate B. Specifically, the formal certificate issuance unit 632 administrates processing progress to carry out the formal certification B in the correspondence with the certificate ID of the temporary certificate B which already received. In addition, the formal certificate issuance unit 432 in the formal certification server A40 also administrates processing progress to carry out the formal certification A in the correspondence with the certificate ID of the temporary certificate A which already received. The formal certificate issuance unit 632 in the formal certification server B60 identifies the certification processing of the formal certification B carrying out by the certificate ID of the temporary certificate B in the notice of cancellation which is received and cancels the certification processing which is identified. As explained in the step S63, when the formal certificate issuance unit 632 receives the cancellation request including the temporary certificate B which is transmitted from the user terminal 10, the formal certificate issuance unit 632 stops processing of the formal certification B and cancels processing of the formal certification B.

Step S64: The administration unit 631 in the formal certification server B60 transmits the cancellation completion message indicating cancellation of the formal certification B having been completed to the user terminal 10. Specifically, the administration unit 631 in the formal certification server B60 transmits the cancellation completion message to the administration unit 531 in the temporary certification server B50. The administration unit 531 in the temporary certification server B50 receives the cancellation completion message and transmits it to the reference request unit 232 in the reference origin server 20. The reference request unit 232 in the reference origin server 20 transmits the cancellation completion message to the user terminal 10 through the Web application 231. The administration unit 151 in the user terminal 10 receives the cancellation completion message.

Step S65: When the administration unit 151 in the user terminal 10 receives the cancellation completion message, the administration unit 151 displays that the certification cancellation was completed to the display device 121.

By the cancellation processing which is explained in FIG. 25, it is possible to cancel the certification that the user does not aim at. As a result, it is possible to reduce the processing load and save a hardware resource.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system communicating with a user terminal via a communication network, comprising:

a first certification device which carries out a first temporary certification processing requiring a first processing time for a first certification target person in response to a certification request from the user terminal, creates a first temporary certificate by finishing the first temporary certification processing, transmits the first temporary certificate to the user terminal, carries out a first formal certification processing requiring a second processing time, longer than the first processing time, for the first certification target person, and creates a first formal certificate by finishing the first formal certification processing;

a second certification device which carries out a second temporary certification processing requiring a third processing time for a second certification target person based on the first temporary certificate in response to the certification request from the user terminal, creates a second temporary certificate by finishing the second temporary certification processing, transmits the second temporary certificate to the user terminal, carries out a second formal certification processing requiring a fourth processing time, longer than the third processing time for the second certification target person, and creates a second formal certificate by finishing the second formal certification processing;

and a processing device, remote from the first and second certification devices via the communication network, which receives an information processing request including the first temporary certification and the second temporary certification from the user terminal, verifies validity of the first formal certificate corresponding to the first temporary certificate and the validity of the second formal certificate corresponding to the second temporary certificate in response to the information processing request, and determines whether information processing corresponding to the information processing request is executed based on whether the first and second formal certificates are valid.

2. The information processing system according to claim 1, wherein the first certification device comprises a first processor which carries out the first temporary certification processing which has a first certification degree based on first certification information transmitted from the user terminal as the certification request, and carries out the first formal certification processing which has a second certification degree, higher than the first certification degree of the first temporary certification processing, and wherein the second certification device comprises a second processor which carries out the second temporary certification processing which has a third certification degree based on the first temporary certificate transmitted from the user terminal as the certification request, and carries out the second formal certification processing which has a fourth certification degree, higher than the third certification degree of the second temporary certification processing, based on second certification information transmitted from the user terminal as the certification request.

3. The information processing system according to claim 2, wherein the system further comprises a storage device which stores the first formal certificate and the second formal certificate, and wherein the first certification device comprises:

a first temporary certification device which carries out the first temporary certification, transmits the first temporary certificate to the user terminal, and requests the first formal certification; and a first formal certification device which carries out the first formal certification in response to the certification request of the first formal certification, creates the first formal certificate, and stores the first formal certificate in the storage device, and wherein the second certification device comprises:

a second temporary certification device which receives the first temporary certificate, carries out the second temporary certification based on the first temporary certificate, creates the second temporary certificate, transmits the second temporary certificate to the user terminal, and requests the second formal certification; and a second formal certification device which carries out the second formal certification in response to the certification request of the second formal certification, creates the second formal certificate, and stores the second formal certificate in the storage device, and wherein the processing device is configured to receive the information processing request and respond with the information processing request.

4. The information processing system according to claim 3, wherein the second temporary certification device comprises a third processor which carries out the second temporary certification processing based on the first temporary certificate which is received again, creates the second temporary certificate, transmits the second temporary certificate to the user terminal and requests the second formal certification from the second formal certification device.

5. The information processing system according to claim 3, wherein the second formal certification device is configured to administrate processing of the second formal certification processing in correspondence with the second temporary certificate and stop the second formal certification processing when receiving a cancel request including the second temporary certificate from the user terminal.

6. The information processing system according to claim 2, wherein the processing device is configured to carry out the information processing corresponding to the information processing request when the verification is successful and transmit an execution result to the user terminal.

7. The information processing system according to claim 6, wherein the processing device is configured to receive another information processing request including the first temporary certificate and the second temporary certificate, which are transmitted from the user terminal after transmitting the execution result, and respond to the other information processing request.

8. The information processing system according to claim 2, wherein the first certification device is configured to carry out the first temporary certification processing based on a user identification and a password in the first certification information and a stored user identification and a stored password which are stored beforehand, and carry out the first formal certification processing based on an electronic-certificate which is received.

9. The information processing system according to claim 2, wherein the second certification device is configured to carry out the second formal certification processing based on an electronic-certificate which is received.

10. The information processing system according to claim 1, wherein the second certification device is configured to carry out the second temporary certification processing based on an authority authorization.

11. An information processing method, comprising:

a first process in which a first certification device carries out a first temporary certification processing requiring a first processing time for a first certification target person in response to a certification request received from a user terminal via a communication network, creates a first temporary certificate by finishing the first temporary certification processing, transmits the first temporary certificate to the user terminal, carries out a first formal certification processing requiring a second processing time, longer than the first processing time, for the first certification target person, creates a first formal certificate by finishing the first formal certification processing and stores the first formal certificate in a storage device;

a second process in which a second certification device carries out a second temporary certification processing requiring a third processing time for a second certification target person based on the first temporary certificate in response to the certification request of the user terminal, creates a second temporary certificate by finishing the second temporary certification processing, transmits the second temporary certificate to the user terminal, carries out a second formal certification processing requiring a fourth processing time, longer than the third processing time for the second certification target person, creates a second formal certificate and stores the second formal certificate in the storage device; and a third process in which a processing device, remote from the first and second certification devices via the communication network receives an information processing request including the first temporary certification and the second temporary certification from the user terminal, verifies validity of the first formal certificate corresponding to the first temporary certificate and the validity of the second formal certificate corresponding to the second temporary certificate in response to the information processing request and determines whether an information processing corresponding to the information processing request is executed based on a verification result.

12. The information processing method according to claim 11, wherein the first process further comprises:

receiving a first certification information transmitted from the user terminal;

carrying out the first temporary certification processing which has a first certification degree based on the first certification information;

creating the first temporary certificate which indicates a first execution result of the first temporary certification;

carrying out the first formal certification processing which has a second certification degree, higher than the first certification degree of the first temporary certification processing; and creating the first formal certificate which indicates a second execution result of the first formal certification, and wherein the second process comprises:
receiving the first temporary certificate and a second certification information transmitted from the user terminal;
carrying out the second temporary certification processing which has a third certification degree based on the first temporary certificate;
creating the second temporary certificate which indicates a third execution result of the second temporary certification;
carrying out the second formal certification processing which has a fourth certification degree, higher than the third certification degree of the second temporary certification processing, based on the second certification information; and
creating the second formal certificate which indicates a fourth execution result of the second formal certification.

13. The information processing method according to claim 12, wherein the third process comprises:
carrying out the information processing corresponding to the information processing request when the verification is successful; and
transmitting a fifth execution result of the information processing to the user terminal.

14. The information processing method according to claim 13, wherein the third process comprises:
receiving another information processing request including the first temporary certificate and the second temporary certificate which are transmitted from the user terminal after transmitting of the fifth execution result; and
responding to the other information processing request.

15. The information processing method according to claim 12, wherein the second process comprises:
receiving the first temporary certificate again;
carrying out the second temporary certification processing based on the first temporary certificate;
creating the second temporary certificate;
transmitting the second temporary certificate to the user terminal; and
requesting the second formal certification to the second formal certification.

16. The information processing method according to claim 12, wherein the second process comprises:
administrating the second formal certification processing in correspondence with the second temporary certificate; and
stopping the second formal certification processing upon receiving a cancel request including the second temporary certificate from the user terminal.

17. The information processing method according to claim 12, wherein the first process comprises:
carrying out the first temporary certification processing based on a user identification and a password in the first certification information and a stored user identification and a stored password which are stored beforehand; and
carrying out the first formal certification processing based on an electronic-certificate in the first certification information.

18. The information processing method according to claim 12, wherein the second process comprises:
carrying out the second formal certification processing based on an electronic-certificate in the second certification information.

19. Computer-readable non-transitory tangible recording media having stored therein a programs for causing a computers to execute a process, the process comprising:
carrying out a first temporary certification processing in a first certification server, requiring a first processing time for a first certification target person in response to a certification request of a user received from an external device via a communication network, creating a first temporary certificate by finishing the first temporary certification processing, and transmitting the first temporary certificate to the external device;
carrying out a first formal certification processing in the first certification server, requiring a second processing time, longer than the first processing time, for the first certification target person, creating a first formal certificate by finishing the first formal certification processing and storing the first formal certificate in a storage device;
carrying out a second temporary certification processing in a second certification server, requiring a third processing time for a second certification target person based on the first temporary certificate in response to the certification request from the user, creating a second temporary certificate by finishing the second temporary certification processing, and transmitting the second temporary certificate to the user terminal;
carrying out a second formal certification processing in the second certification server, requiring a fourth processing time, longer than the third processing time, for the second certification target person, creating a second formal certificate by finishing the second formal certification processing and storing the second formal certificate in the storage device;
verifying, in a verification server remote from the first and second certification servers via the communication network, validity of the first formal certificate corresponding to the first temporary certificate and the validity of the second formal certificate corresponding to the second temporary certificate in response to an information processing request; and
determining whether information processing corresponding to the information processing request is executed based on whether the first and second formal certificates are valid.

* * * * *